(12) United States Patent
Diez et al.

(10) Patent No.: US 9,136,039 B2
(45) Date of Patent: Sep. 15, 2015

(54) CELL CONNECTOR

(71) Applicants: ElringKlinger AG, Dettingen (DE); Bayerische Motoren Werke Aktiengesellschaft, Munich (DE)

(72) Inventors: Armin Diez, Lenningen (DE); Hubertus Goesmann, Auernheim (DE); Axelle Hauck, Neubiberg (DE); Christian Zachar, Groebenzell (DE)

(73) Assignees: ElringKlinger AG, Dettingen (DE); Bayerische Motoren Werke Aktiengesellschaft, Munich (DE)

( * ) Notice: Subject to any disclaimer, the term of this patent is extended or adjusted under 35 U.S.C. 154(b) by 7 days.

(21) Appl. No.: 14/084,180

(22) Filed: Nov. 19, 2013

(65) Prior Publication Data

US 2014/0069690 A1 Mar. 13, 2014

Related U.S. Application Data

(63) Continuation of application No. PCT/EP2012/058582, filed on May 9, 2012.

(30) Foreign Application Priority Data

May 27, 2011 (DE) .................. 10 2011 076 624 U

(51) Int. Cl.
*H01B 5/00* (2006.01)
*H01M 2/20* (2006.01)
(Continued)

(52) U.S. Cl.
CPC .................. *H01B 5/00* (2013.01); *H01M 2/202* (2013.01); *H01M 10/0525* (2013.01); *H01M 4/5825* (2013.01); *Y02E 60/122* (2013.01); *Y10T 29/49204* (2015.01)

(58) Field of Classification Search
CPC .............. H01M 2/202; H01M 4/5825; H01M 10/0525; Y10T 29/49204; Y02E 60/122; H01B 5/00
USPC ......... 439/627, 500, 510, 513, 522, 840, 759, 439/762, 841; 174/126.1; 29/874
See application file for complete search history.

(56) References Cited

U.S. PATENT DOCUMENTS 8,721,368 B2 * 5/2014 Zhao .............................. 439/627
8,871,376 B2 * 10/2014 Khakhalev .................... 429/158
(Continued)

FOREIGN PATENT DOCUMENTS

| DE | 10 2009 050 314 | 4/2011 |
|----|-----------------|--------|
| DE | 10 2010 019 708 | 11/2011 |

(Continued)

*Primary Examiner* — Edwin A. Leon
(74) *Attorney, Agent, or Firm* — Womble Carlyle Sandridge & Rice, LLP

(57) ABSTRACT

A cell connector for the electrically conductive connection of a first cell terminal of a first electrochemical cell and a second cell terminal of a second electrochemical cell of an electrochemical device is provided, the cell connector including a first contact region for connection to the first cell terminal and a second contact region for connection to the second cell terminal, where the cell connector allows a large relative displacement between the first contact region and the second contact region even under the influence of only small deformation forces. The cell connector can include a base body made of two or more material layers, at least two material layers being connected to one another in one piece along a fold line.

15 Claims, 39 Drawing Sheets

(51) Int. Cl.
H01M 10/0525 (2010.01)
*H01M 4/58* (2010.01)

(56) References Cited

U.S. PATENT DOCUMENTS

| | | |
|---|---|---|
| 2006/0270277 A1 | 11/2006 | Zhao et al. |
| 2008/0063929 A1 | 3/2008 | Byun et al. |
| 2010/0266889 A1 | 10/2010 | Kim |
| 2011/0097618 A1 | 4/2011 | Hauck et al. |
| 2011/0117412 A1 | 5/2011 | Park |
| 2012/0208410 A1 | 8/2012 | Ikeda et al. |

FOREIGN PATENT DOCUMENTS

| | | |
|---|---|---|
| EP | 2 284 930 | 2/2011 |
| JP | 2002-151045 | 5/2002 |
| JP | 2005-317323 | 11/2005 |

\* cited by examiner

CELL CONNECTOR

CROSS-REFERENCE TO RELATED APPLICATIONS

The present application is a continuation of international application number PCT/EP2012/058582, filed May 9, 2012, which claims priority to German patent application number 10 2011 076 624.3, filed May 27, 2011, the entire specification of both being incorporated herein by reference in their entirety and for all purposes.

FIELD OF THE DISCLOSURE

The present invention relates to a cell connector for the electrically conductive connection of a first cell terminal of a first electrochemical cell and a second cell terminal of a second electrochemical cell of an electrochemical device, the cell connector comprising a first contact region for connection to the first cell terminal and a second contact region for connection to the second cell terminal.

BACKGROUND

Electrochemical devices of this type can, in particular, be configured as electric accumulators, for example as lithium-ion accumulators.

In a lithium-ion accumulator, the voltage difference between the two cell terminals (poles) of an individual accumulator cell is about 3.6 V. In order to obtain a higher voltage level of, for example, about 360 V, which is required for many applications, for example in automotive drive engineering, many such accumulator cells (for example about 100) have to be electrically connected in series.

In connection therewith, the accumulator cells or, in general, electrochemical cells can be combined into modules, which in each case contain a plurality of such electrochemical cells, the installation direction of cells arranged next to one another alternating, so that positive and negative cell terminals alternately lie next to one another.

These mutually adjacent cell terminals with opposite polarity are directly connected to one another for the series connection of the cells by means of a respective cell connector.

Forces acting on the cell terminals, which are transmitted by the cell connector, occur owing to different thermal expansions of the arrangement of electrochemical cells and the cell connector (because of temperature differences and/or because of differences in the respective thermal coefficients of expansion).

SUMMARY OF THE INVENTION

The present invention is based on the object of providing a cell connector for an electrochemical device of the type mentioned in the introduction, which allows a large relative displacement between the first contact region and the second contact region even under the influence of only small deformation forces.

This object is achieved according to the invention in a cell connector with the features of the preamble of claim 1 in that the cell connector comprises a base body made of two or more material layers, at least two material layers being connected to one another in one piece along a fold line.

By using a multi-layer cell connector, a lower axial area moment is used than when using a single-layer cell connector.

Since at least two material layers of the multi-layer base body, preferably all the material layers of the multi-layer base body, are connected to one another in one piece along one or more fold lines, simple and reliable electrical contacting and mechanical connection between a plurality of layers of the base body is provided, without an additional complex joining process, for example a welding process, in particular a laser welding process, being necessary for this.

Therefore, by folding, a cell connector is produced, which, for example, is producible in a progressive die and the individual layers of which do not have to be connected to one another by welding or other connecting mechanisms.

The fold, depending on the geometry of the cell connector or depending on the requirements of the cell connector, can be located laterally on the cell connector or on the end face of the cell connector.

If the fold line is on the end face of the cell connector, an additional connection of the layers can take place by means of a further connecting measure, for example by welding, on the opposite side.

The folding along the fold line is to be carried out geometrically in such a way that the current cross-section does not fall below that required for the passage of current through the cell connector.

At least two material layers, in particular all the material layers, of the base body lie, at least in portions, in particular in the first contact region and/or in the second contact region of the cell connector, substantially flat on one another.

In a special configuration of the invention it is provided that at least one fold line runs, at least in portions, transversely, preferably substantially perpendicularly, to a connection direction, which connects a center of the first contact region and a center of the second contact region to one another.

The cell connector according to the invention is particularly easily producible when the base body has no weld connections and/or, apart from the one piece nature of the material layers, has no other connecting mechanisms between the material layers of the base body.

Furthermore, it is favorable if the base body has no substance-to-substance bonds between the material layers of the base body.

The base body of the cell connector preferably comprises the first contact region and/or the second contact region of the cell connector.

The base body of the cell connector is preferably formed in one piece.

Furthermore, it may be provided that at least one fold line runs substantially transversely, in particular substantially perpendicularly, to the connection direction.

At least one portion of at least one fold line can run along a lateral edge of the first contact region or the second contact region.

Furthermore, in a special configuration of the cell connector according to the invention it may be provided that at least one fold line runs, at least in portions, preferably substantially completely, substantially parallel to a connection direction, which connects a center of the first contact region and a center of the second contact region to one another.

Furthermore, it may be provided that at least one fold line runs in a first portion along a lateral edge of the first contact region and, in a second portion, along a lateral edge of the second contact region.

In this case, in particular the fold line between the first portion and the second portion can be interrupted by a recess.

In a special configuration of the cell connector according to the invention it may be provided that at least one of the material layers of the base body comprises at least two part material layers, which are connected in one piece to another material layer along fold lines that are different from one another. In an embodiment of this type, at least one material layer of the base body is not configured in one piece, but divided into at least two part material layers.

In this case, the separating line between the two part material layers preferably runs substantially parallel to a connection direction, which connects a center of the contact region and a center of the second contact region to one another.

At least two part material layers of the divided material layer of the base body can both be connected in one piece to the same other material layer of the base body by means of fold lines that are different from one another.

As an alternative to this it is also conceivable for two part material layers of the divided material layer of the base body to be connected along fold lines that are different from one another to two other material layers of the base body that are different from one another.

The fold lines that are different from one another, along which the at least two part material layers are connected in one piece to another material layer, are preferably arranged on mutually opposite sides of the divided material layer concerned.

In a special configuration of the cell connector according to the invention it may furthermore be provided that at least one of the material layers of the base body is connected in one piece to two other material layers along fold lines that are different from one another. In this case, the base body of the cell connector thus has at least three material layers connected to one another in one piece, which results in the electrical resistance of the base body being reduced. With the same current intensity flowing through the cell connector, the cell connector therefore heats up less. Conversely, with the same heating of the cell connector, the current intensity, which the cell connector can carry, increases.

Basically, more than three material layers of the cell connector may also be connected to one another in one piece, in each case, by means of fold lines, in particular in the manner of a concertina-like fold.

The fold lines, which are different from one another and along which the at least one material layer of the base body is connected to two other material layers of the base body, are preferably arranged on mutually opposite sides of the material layer concerned.

In order to allow a particularly reliable and operationally safe connection of the cell terminals, it is provided in preferred configurations of the invention that the base body of the cell connector comprises a resiliently and/or plastically deformable compensation region, which connects the first contact region and the second contact region to one another and allows a movement of these contact regions relative to one another.

Owing to this possibility for moving the two contact portions of the cell connector relative to one another, the resiliently and/or plastically deformable compensation region is used for the at least partial compensation a) of a difference between a longitudinal extent of the cell connector, on the one hand, and a change in the spacing between the longitudinal axes of the cell terminals connected to one another by the cell connector, on the other hand, and/or b) a difference between a longitudinal extent of the first electrochemical cell, on the one hand, and a longitudinal extent of the second electrochemical cell, on the other hand.

In addition to this, the resiliently and/or plastically deformable compensation region can also be used for the at least partial compensation of differences in the positions of the cell terminals to be connected to one another, which are based on manufacturing tolerances, in particular in the axial direction of the electrochemical cells.

In order to allow the desired relative movement between the two contact regions of the cell connector, the compensation region is preferably provided with a profiling, in particular with a corrugated structure and/or a zigzag structure and/or a bead structure.

In particular, it may be provided that the compensation region of the cell connector has at least one compensation corrugation, compensation bead or compensation bending line running transversely to a connection direction, which connects a center of the first contact region and a center of the second contact region to one another.

The compensation region is preferably not formed in only one of the material layers of the base body, but in two or more material layers lying on top of one another.

In order to easily be able to detect and evaluate the electric potential at the cell connector, it is advantageous if the base body of the cell connector comprises at least one voltage tap.

An evaluation unit of the electrochemical device is connectable to this voltage tap by means of a suitable electric line.

At least one such voltage tap is preferably strip-like.

In order to be able to detect the electric potential at the first contact region and at the second contact region of the cell connector and to be able to evaluate it, it is favorable if the base body of the cell connector comprises at least two voltage taps, one voltage tap being connected to the first contact region and a further voltage tap being connected to the second contact region.

In a preferred configuration of the cell connector according to the invention, it is provided that at least one voltage tap of the cell connector is formed in only one material layer of the base body of the cell connector.

All the voltage taps of the cell connector are preferably formed, in each case, in only one material layer of the base body of the cell connector.

It is particularly favorable if a plurality of, preferably all, the voltage taps of the cell connector are formed in the same material layer of the base body of the cell connector.

The extent of the base body of the cell connector in a longitudinal direction of the cell connector parallel to the connection direction of the cell connector is preferably greater than in a transverse direction of the cell connector perpendicular to the longitudinal direction of the cell connector and to the axial direction of the electrochemical cells connected to one another by means of the cell connector.

The electrochemical device, in which the cell connector is inserted, can, in particular, be in the form of an accumulator, for example a lithium-ion accumulator.

When the electrochemical device according to the invention is in the form of an accumulator, it is particularly suitable as a highly loadable energy source, for example to drive motor vehicles.

The present invention furthermore relates to a method for producing a cell connector, which comprises a first contact region for connection to a first cell terminal of a first electrochemical cell and a second contact region for connection to a second cell terminal of a second electrochemical cell.

The present invention is based on the further object of providing a method of the type by means of which a cell connector is produced, which allows a reliable and operationally safe connection of the cell terminal.

This object is achieved according to the invention by a method for producing a cell connector, comprising the following method step:

folding a base body blank along at least one fold line for producing a one-piece multi-layer base body of the cell connector.

Further features and advantages of the invention are the subject of the following description and the graphical view of embodiments.

BRIEF DESCRIPTION OF THE DRAWINGS

The same or functionally equivalent elements are designated by the same reference numerals in all the figures.

DETAILED DESCRIPTION OF THE INVENTION

Figure 1:
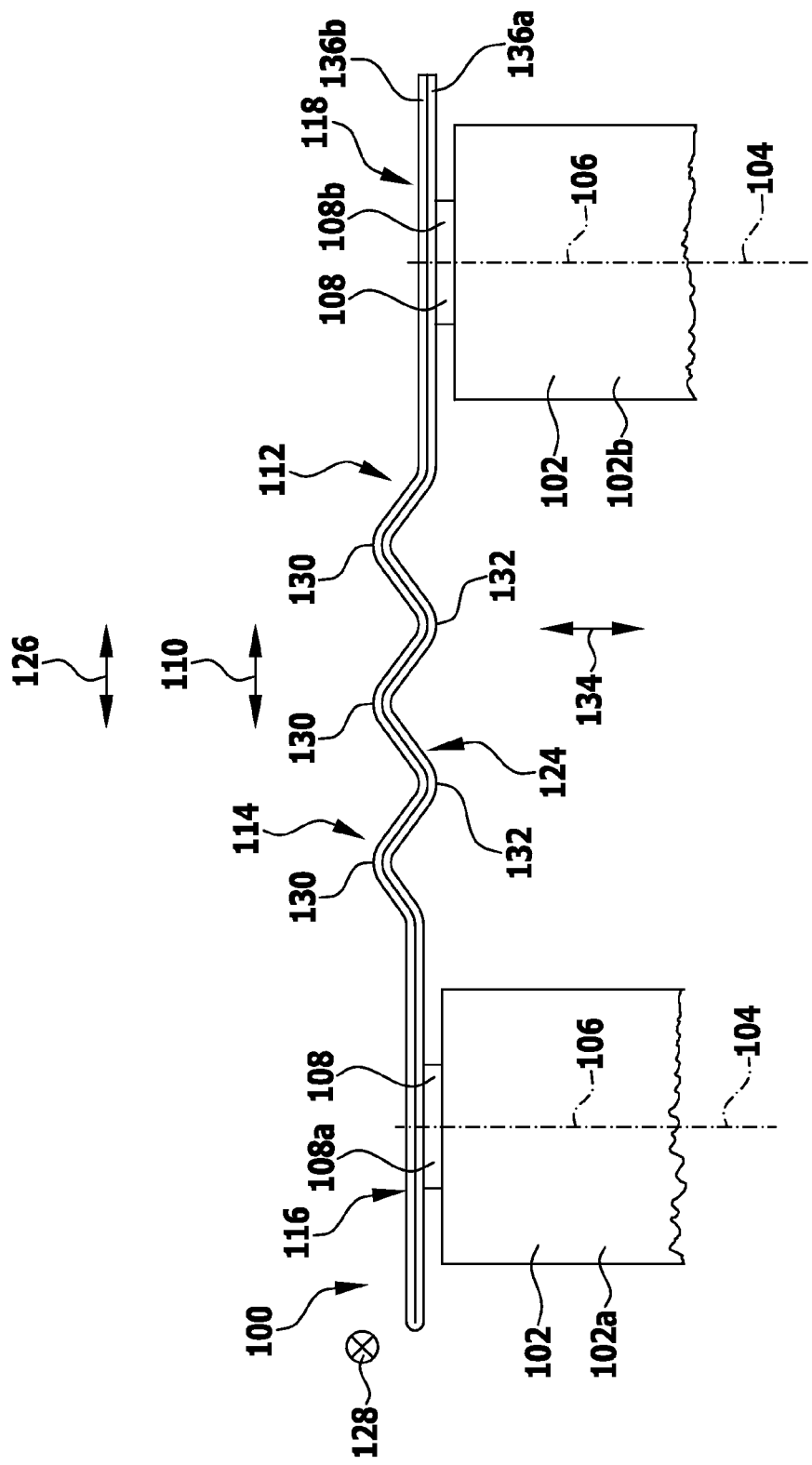
FIG. 1 shows a schematic longitudinal section through a cell connector and, in each case, a part of the two electrochemical cells, which are connected to one another by means of the cell connector, the cell connector comprising a base body made of two material layers, which are connected to one another in one piece along a fold line.

An electrochemical device designated 100 as a whole comprises, for example, a plurality of electrochemical modules (not shown), of which each one comprises a plurality of, for example, in each case, eight or twelve, electrochemical cells 102, which are, in each case, received in a receiver of a receiving device (not shown) of the module.

A receiving device of this type may, in particular, be in the form of a cooling body, which is in heat-conducting contact with the electrochemical cells accommodated therein in order to dissipate heat from the electrochemical cells 102 during the operation of the electrochemical device 100.

The electrochemical cells 102 are arranged and oriented in the receiving device surrounding them in such a way that axial directions 104 of the electrochemical cells 102, which run parallel to the central longitudinal axes 106 of the electrochemical cells 102, are oriented substantially parallel to one another.

Each of the electrochemical cells 102 extends here from a front cell terminal 108 in the respective axial direction 104 to a rear cell terminal (not shown), each cell terminal in each case forming a positive pole or a negative pole of the electrochemical cell 102.

The central longitudinal axes 106 of the electrochemical cells 102 are, in this case, simultaneously central longitudinal axes of the cell terminal 108 of the respective electrochemical cells 102.

In one module, mutually adjacent electrochemical cells 102 are in each case oriented in such a way that the cell terminals arranged on the same side of the module of two adjacent cells 102a, 102b have an opposite polarity to one another.

Thus, for example in the cell arrangement shown in FIG. 1, the front cell terminal 108a of the electrochemical cell 102a forms a negative pole of the electrochemical cell 102a concerned, while the front cell terminal 108b of the electrochemical cell 102b adjacent in a connection direction 110 of the electrochemical cell 102a, forms a positive pole of the electrochemical cell 102b.

The electrochemical device 100 can, in particular, be in the form of an accumulator, in particular a lithium-ion accumulator, for example of the type $LiFePO_4$.

The electrochemical cells 102 of the electrochemical modules may accordingly be in the form of accumulator cells, in particular as lithium-ion accumulator cells, for example of the type $LiFePO_4$.

Each electrochemical module furthermore comprises a plurality of cell connectors 112, by means of which the cell terminals 108 of mutually adjacent electrochemical cells 102 with a different polarity are electrically conductively connected to one another, in order to thus electrically connect all the electrochemical cells 102 of an electrochemical module in series.

In this case, each cell connector 112 connects a first cell terminal 108a of negative polarity to a second cell terminal 108b of positive polarity of an adjacent electrochemical cell 102.

In order to electrically connect all the electric chemical cells 102 of a module in series, apart from the front cell terminals 108 of adjacent electrochemical cells, the rear cell terminals of mutually adjacent electrochemical cells of a module are also connected to one another by cell connectors (not shown).

Each of the cell connectors 112, which, in each case, electrically conductively connects a first cell terminal 108a and a second cell terminal 108b to one another, comprises a base body 114 with a first contact region 116, which, in the assembled state of the cell connector 112, is connected to a (for example negative) first cell terminal 108a of an electrochemical cell 102a, and a second contact region 118, which, in the assembled state of the cell connector 112, is connected to a (for example positive) second cell terminal 108b of another electrochemical cell 102b.

The base body 114 of the cell connector 112 is preferably produced as a stamped and bent component.

The basic body 114 of the cell connector 112, may, in particular, be formed from aluminum, copper, tin, zinc, iron, gold or silver or from an alloy of one or more of the aforementioned metals.

Furthermore, the base body 114 of the cell connector 112 may also be formed from another metal or from another metallic alloy.

Moreover, the base body 114 of the cell connector 112 can basically also be formed from a conductive plastics material and/or from a conductive carbon material.

The first contact region 116 and the second contact region 118 of the cell connector 112 are preferably connected by a substance-to-substance bond to the respectively associated cell terminal 108a or 108b.

A substance-to-substance bond of this type can, in particular, be produced by welding, in particular laser welding or by soldering.

Depending on the material, from which the cell terminals 108a and 108b are formed, to facilitate the production of a substance-to-substance bond to the cell connector 112, it may be provided that one or more coatings, in particular made of a metallic material, are arranged in the respective contact region 116, 118 of the cell connector 112 and/or on the respective cell terminal 108a or 108b.

Furthermore, it may it may be provided that to facilitate the production of a substance-to-substance bond between the cell connector 112 and the cell terminals 108a, 108b, one or more intermediate elements (not shown) are arranged between the respective contact region 116, 118 of the cell connector 112, on the one hand, and the respectively associated cell terminal 108a or 108b, on the other hand.

Figure 3:
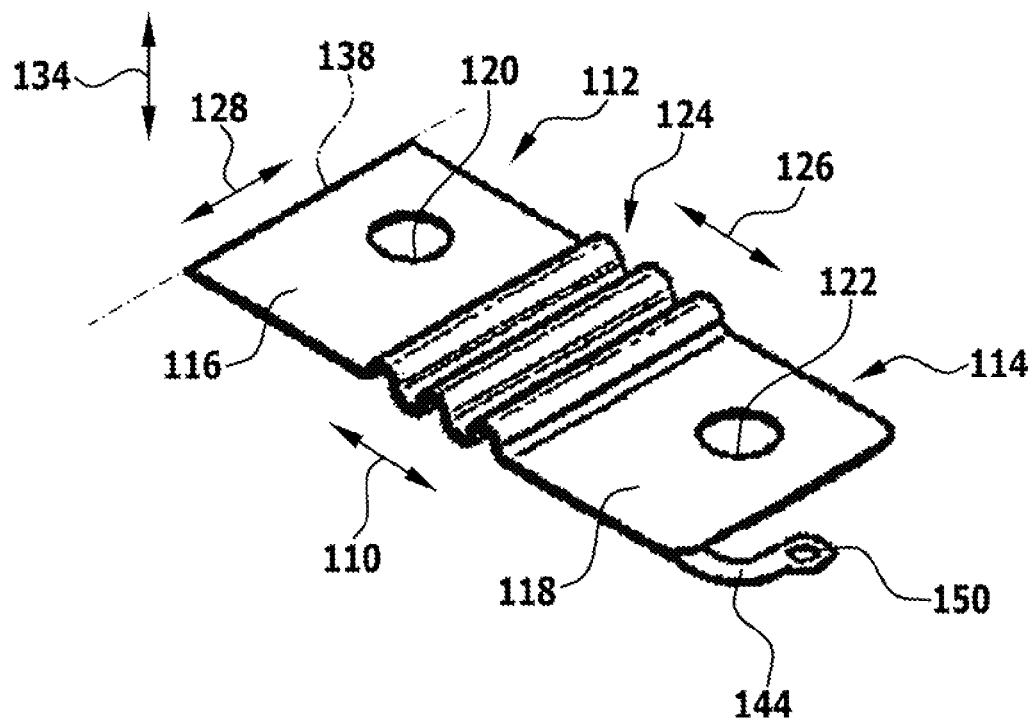
FIG. 3 shows a schematic perspective view of the cell connector from FIGS. 1 and 2.

In order to also allow a direct access, for example for measuring purposes, to the cell terminals 108a and 108b after the substance-to-substance bonding of the cell connector 112 to the cell terminals 108a and 108b, the first contact region 116 of the cell connector 112 can be provided with a, for example, substantially circular, through-opening 120 and the second contact region 118 of the base body 114 can be provided with a, for example also substantially circular, through-opening 122 (see FIG. 3).

During operation of the electrochemical device 100, because of different temperatures and/or because of different thermal coefficients of expansion of the cell connectors 112, on the one hand, and of the receiving device for the electrochemical cells 102, on the other hand, a difference may occur between a longitudinal extent of the cell connectors 112, on the one hand, and a change in the spacing may occur between the longitudinal axes 106 of the cell terminals 108a, 108b connected to one another by the cell connectors 112, on the other hand. By means of a temperature change, the relative positions of the cell terminals 108a, 108b connected to one another by a cell connector 112 are changed in the connection direction 110 oriented perpendicularly to the axial direction 104 of the electrochemical cells 102.

Figure 4:
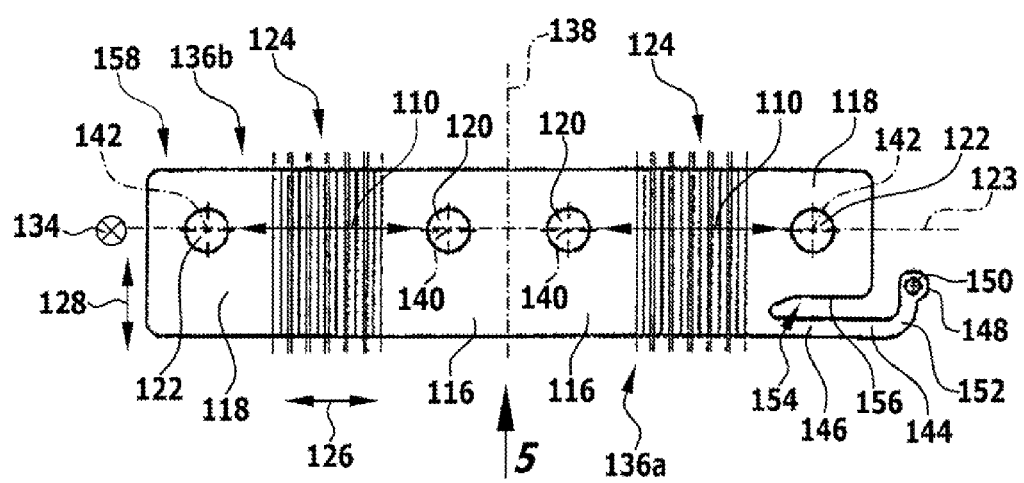
FIG. 4 shows a schematic plan view of a base body blank of the cell connector from FIGS. 1 to 3, from which the base body is formed by folding.

The connection direction 110 lies in a plane 123, which contains the longitudinal axes 106 of the electrochemical cells 102a and 102b (see FIG. 4).

Furthermore, because of different longitudinal extents of the electrochemical cells 102 connected by a cell connector 112, a change in the relative positions between the cell terminals 108a, 108b connected to one another may occur along the axial direction 104 of the electrochemical cells 102 connected to one another.

In order to be able to compensate such differences between a longitudinal extent of the cell connector 112, on the one hand, and a change in the spacing between the longitudinal axes 106 of the cell terminals 108a, 108b connected to one another by the cell connector 112, on the other hand, and/or such differences between a longitudinal extent of a first electrochemical cell 102a and a second electrochemical cell 102b, which are connected to one another by the cell connector 112, it may be provided that the cell connector 112 comprises a resiliently and/or plastically deformable compensation region 124, which is arranged between the first contact region 116 and the second contact region 118 of the cell connector 112 and connects the two contact regions 116 and 118 to one another.

The base body 114 of the cell connector 112 is preferably provided with a compensation region 124 of this type.

In the embodiment of a cell connector 112 shown in the Figures, the deformable compensation region 124 has a corrugated structure, the corrugated structure comprising one or more, for example three, corrugations with an amplitude directed parallel to the axial direction 104 of the cells 102 to be connected by the cell connector 112 and substantially perpendicularly to the contact faces, with which the cell connector 112, in the assembled state, abuts on the first cell terminal 108a or on the second cell terminal 108b. These corrugations have a plurality of, for example three, corrugation peaks 130 extending transversely, preferably substantially perpendicularly, to the axial direction 104 of the electrochemical cells 102 and transversely, preferably substantially perpendicularly, to a longitudinal direction 126 of the cell connector 112 and substantially parallel to a transverse direction 128 of the cell connector 112, which is oriented perpendicularly to the longitudinal direction 126 of the cell connector 112 and perpendicularly to the axial direction 104 of the electrochemical cells 102, and a plurality of corrugation peaks 132 arranged between the corrugation peaks 130 and extending transversely, preferably substantially perpendicularly, to the axial direction 104 of the electrochemical cells 102 and transversely, preferably substantially perpendicularly, to the longitudinal direction 126 of the cell connector 112 and substantially parallel to the transverse direction 128 of the cell connector 112.

The longitudinal direction 126 of the cell connector runs parallel to the connection direction 110 and the transverse direction 128 of the cell connector 112 runs perpendicularly to the connection direction 110.

The corrugation peaks 130 project upwardly in a contact direction 134 of the cell connector 112, which is perpendicular to the contact faces of the cell connector 112 and, in the assembled state of the cell connector 112, coincides with the axial direction 104 of the electrochemical cells 102, while the corrugation troughs 132 project downwardly in the contact direction 134 (toward the cells 102 to be connected).

The corrugated structure of the deformable compensation region 124 of the cell connector 112 means that the compensation region 124 is easily resiliently and/or plastically deformable in such a way that the second contact region 118 can be displaced relative to the first contact region 116 both in the axial direction 104 of the electrochemical cells 102 and in the longitudinal direction 126 of the cell connector 112 in order to compensate the above-described differences in the relative positions of the cell terminals 108a and 108b to be connected to one another by the cell connector 112. As a result, the occurrence of excessive mechanical stresses at the connecting points between the cell connector 112, on the one hand, and the first cell terminal 108a and the second cell terminal 108b, on the other hand, can be avoided.

In order to also allow very large relative displacements between the first contact region 116 and the second contact region 118 of the cell connector 114 and/or a large relative displacement of the contact regions 116, 118 even under the influence of only small deformation forces, the base body 114 of the cell connector 112 is multi-layered, in the embodiment shown, two-layered, so a low axial area moment is used for the deformation of the compensation region 124 of the base body 114.

In particular, the base body 114 can comprise a first material layer 136a, which, in the assembled state of the cell connector 112, faces the cell terminals 108 of the electrochemical cells 102 to be connected to one another, and a second material layer 136b, which, in the assembled state of the cell connector 112, is remote from the cell terminals 108 of the electrochemical cells 102 to be connected to one another.

Figure 2:
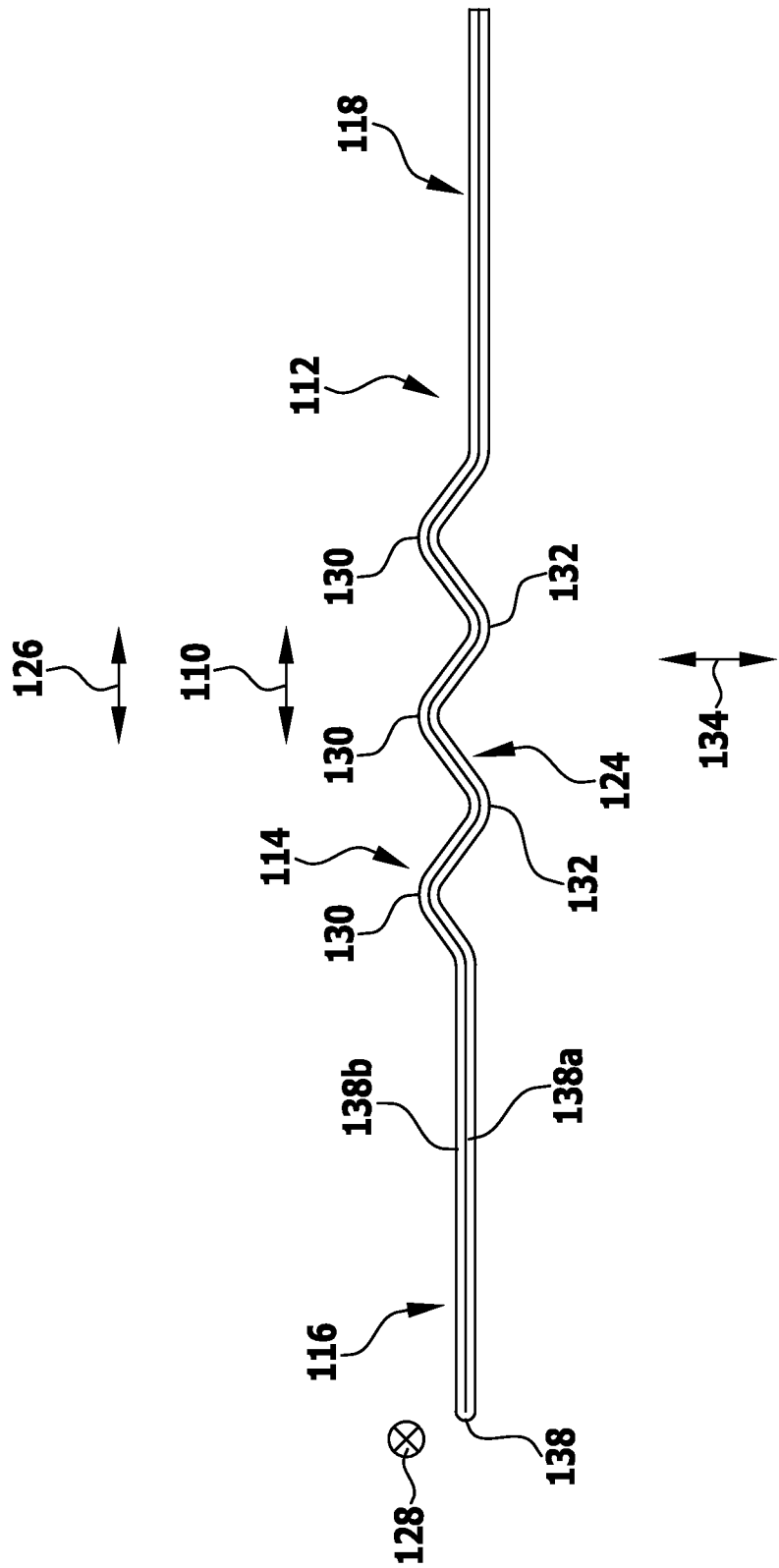
FIG. 2 shows a schematic section through the base body of the cell connector from FIG. 1, without the electrochemical cells connected to one another by the cell connector.

As can best be seen from FIG. 2, the first material layer 136a and the second material layer 136b lie substantially flat on one another.

Furthermore, the material layers 136a and 136b are connected to one another in one piece along a fold line 138, which runs parallel to the transverse direction 128 of the cell connector 112 and perpendicularly to the contact direction 134 and perpendicularly to the connection direction 110 of the cell connector 112 and forms a rear edge of the first contact region 116 remote from the second contact region 118 (see FIG. 3).

The connection direction 110 of the cell connector 112 preferably connects a center 140 of the first contact region 116 and a center of the second contact region 142 to one another, the center of the first contact region 140 coinciding with the central point of the through-opening 120 and the center 142 of the second contact region 118 coinciding with the center point of the second through-opening 122 of the second contact region 118.

One of the material layers 136a, 136b, preferably the first material layer 136a facing the cell terminals 108 in the assembled state of the cell connector 112, preferably has a, for example strip-like, voltage tap 144, which extends away from one of the contact regions 116, 118, for example from the second contact region 118.

In particular, it may be provided that the strip-like voltage tap 144 has an initial portion 146 connected to the respectively associated contact region, which initial portion runs, for example, substantially parallel to the connection direction 110, and has an end portion 148 remote from the respectively associated contact region, which end portion runs, for example, substantially parallel to the transverse direction 128 of the cell connector 112 and is provided with a contacting point 150, to which the voltage tap 144 is connectable by an electric line to tap a voltage.

The initial portion 146 and the end portion 148 of the strip-like voltage tap 144 are preferably connected to one another by a curved center portion 152.

The initial portion 146 of the strip-like voltage tap 144 is preferably separated by a recess 144 running, for example, substantially in the connection direction 110 of the cell connector 112 from a lateral edge 156, which also preferably runs substantially parallel to the connection direction 110 of the cell connector 112, of the respectively associated contact region, for example the second contact region 118.

To produce the base body 114 of the cell connector 112, as shown in FIGS. 1 to 3, the procedure is as follows.

Figure 5:
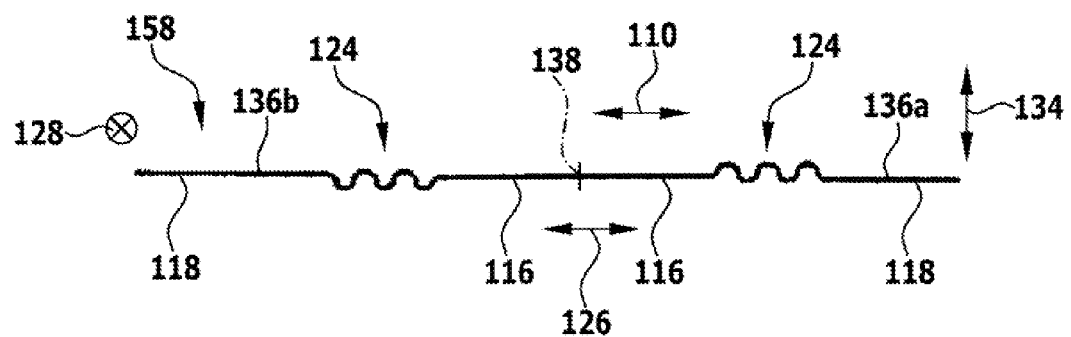
FIG. 5 shows a schematic side view of the base body blank from FIG. 4, with the viewing direction in the direction of the arrow 5 in FIG. 4.
Figure 6:
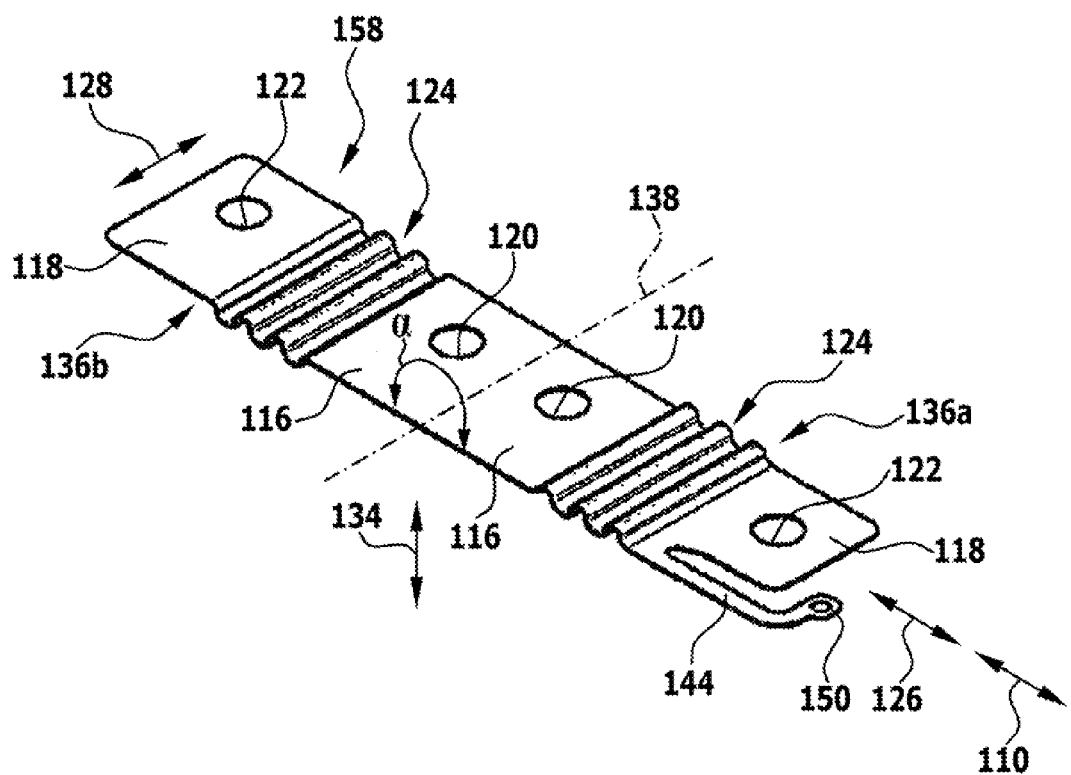
FIG. 6 shows a schematic perspective view of the base body blank from FIGS. 4 and 5.

Firstly, a base body blank 158 shown in FIGS. 4 to 6 is separated out, for example stamped out or cut out (for example by means of a laser) from a starting material, for example from a starting material in the form of sheet metal.

In the base body blank 158, the material layers 136a and 136b are firstly located next to one another in the same plane, the material layers 136a, 136b adjoining one another along the later fold line 138.

In the embodiment of a base body blank 158 shown in FIGS. 4 to 6, the first material layer 136a and the second material layer 136b are arranged one behind the other in the longitudinal direction 126 of the cell connector 112, which corresponds to the connection direction 110.

The corrugation peaks 130 and corrugation troughs 132 of the compensation region 124 are introduced into the base body blank 158 by suitable forming processes, in particular embossing or deep drawing processes, specifically in each case twice, once in the compensation region 124 of the first material layer 136a and once in the compensation region 124 of the second material layer 136b.

The first through-openings 120 and the second through-openings 122 can already be separated out before these forming processes, for example together with the separating out of the external contour of the base body blank 158 from the starting material, or after the forming processes from the base body blank 158.

The cell connector 112 shown in FIG. 3 with the multi-layer base body 114 is then produced from the base body blank 58 shown in FIG. 6 in that one of the two material layers 136a, 136b is folded along the fold line 138 onto the respective other material layer 136b, 136a.

Figure 7:
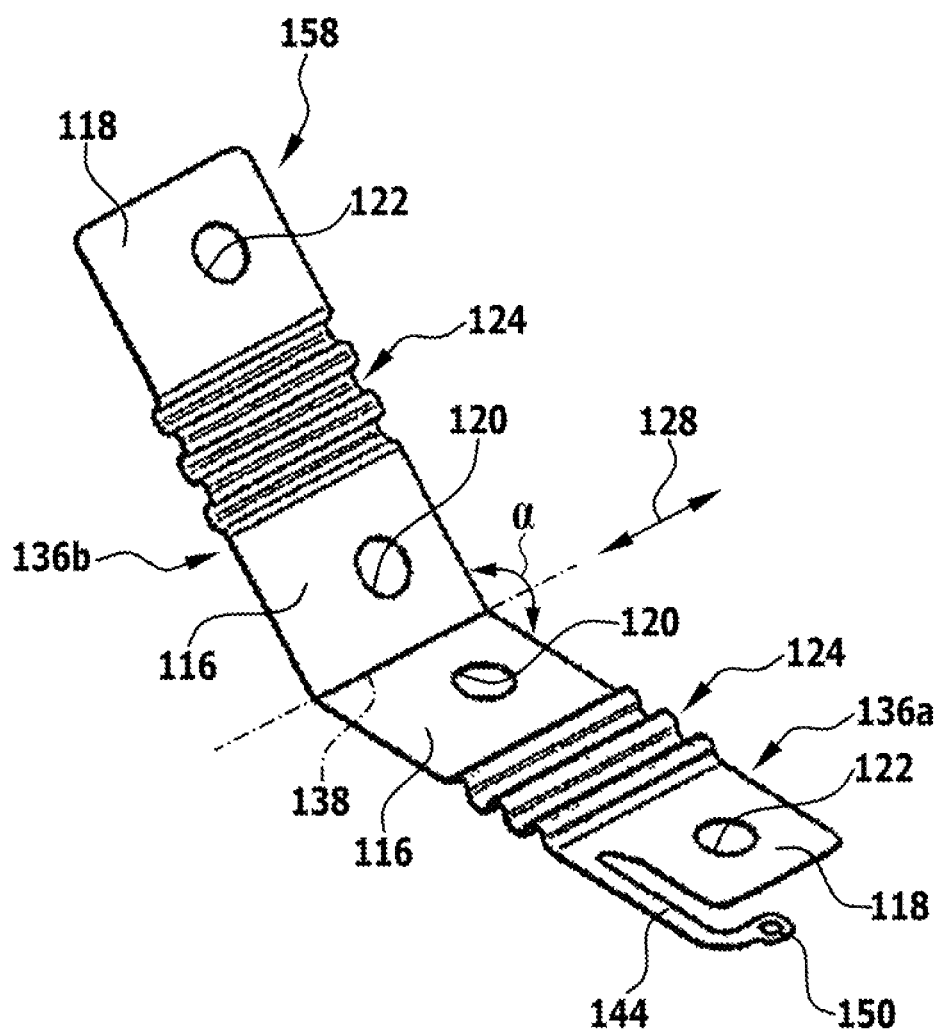
FIGS. 7 to 9 show schematic perspective views of the base body blank from FIG. 6 in three consecutive phases of a folding process, by means of which the cell connector base body according to FIG. 3 is formed from the base body blank according to FIG. 6.
Figure 8:
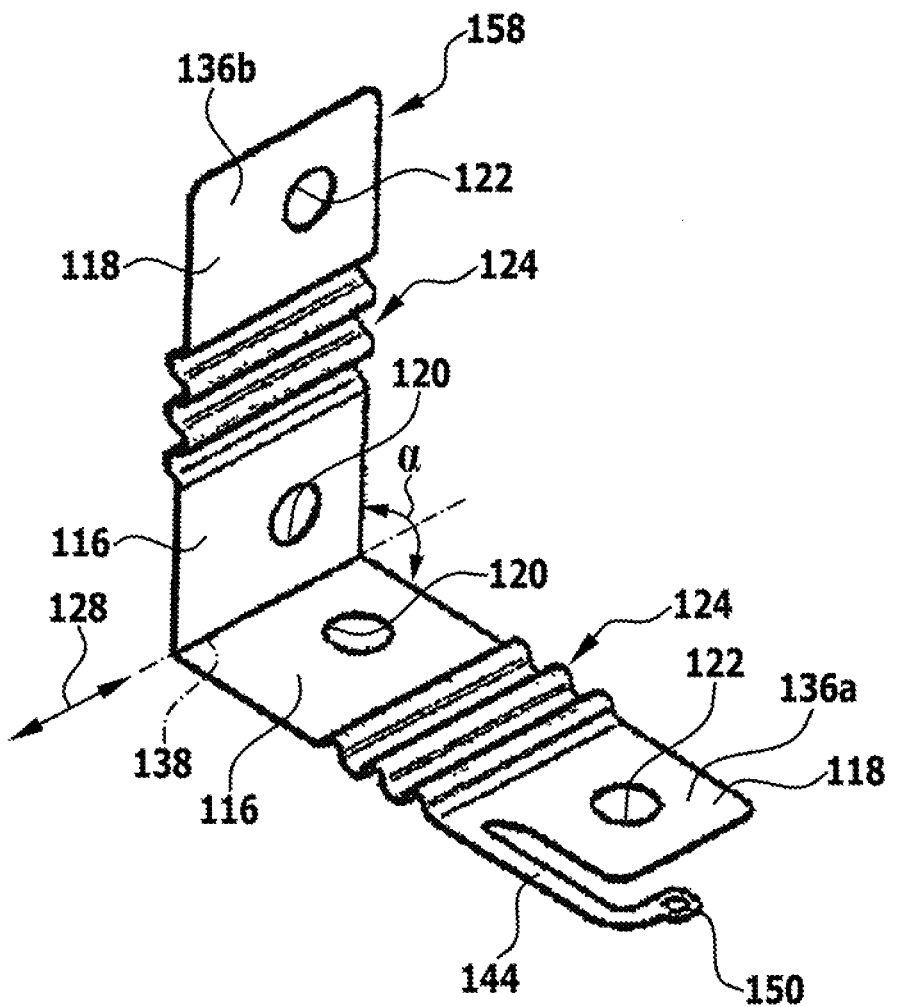
Figure 9:
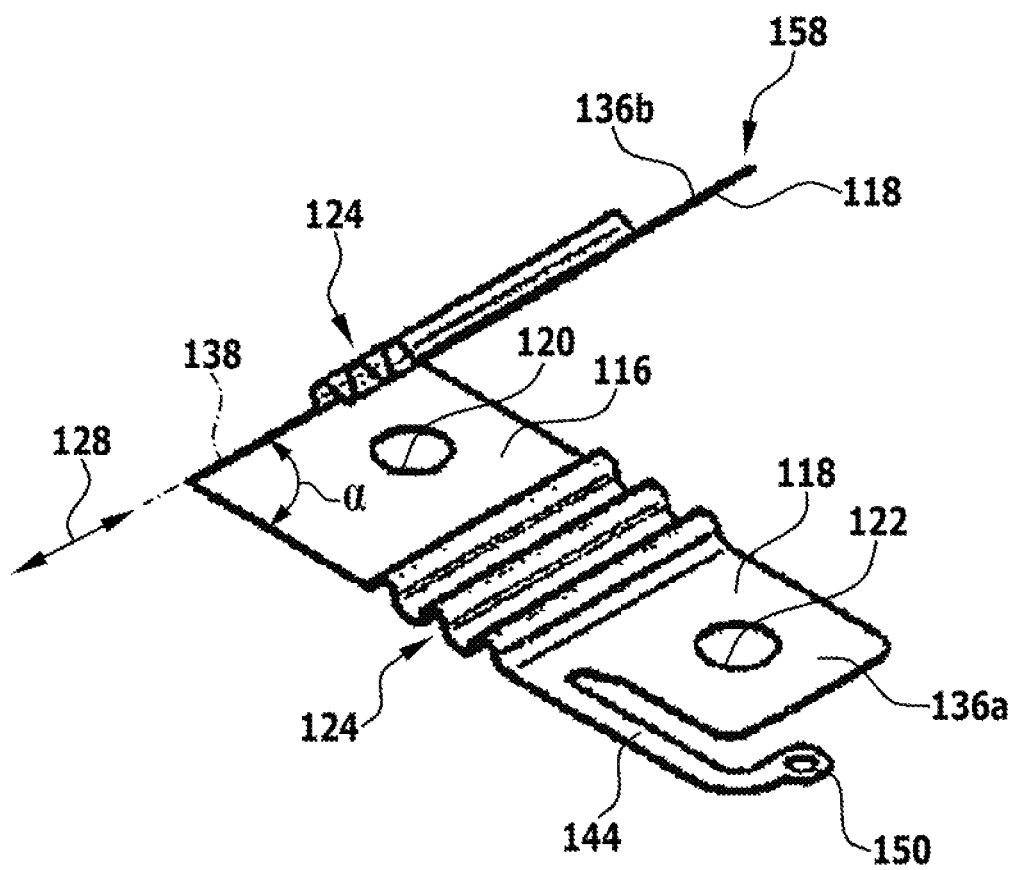

FIGS. 7 to 9 show various phases that follow one another in time of a folding process of the type in which, in the embodiment shown, the second material layer 136b is folded onto the first material layer 136a.

In this folding process, the angle α, which the main planes of the two material layers 136a, 136b include with one another, of 180° (in the base body blank 158 shown in FIG. 6) is continuously reduced until this angle in the finished base body 114 of the cell connector 112 (see FIG. 3) is 0° and the second material layer 136b rests substantially flat on the first material layer 136a.

In the intermediate phases shown in FIGS. 7 to 9 of the folding process, the angle α between the two material layers 136a and 136b is in each case 135° (FIG. 7), 90° (FIG. 8) or 45° (FIG. 9).

As the two material layers 136a and 136b are connected to one another in one piece at the end face, in other words along a fold line 138 running in the transverse direction 128 of the cell connector 112, it is favorable if the two material layers 136a, 136b are connected to one another on the end face opposing the fold line 138 by an additional measure, for example by welding, in order to prevent an unintentional release of the material layers 136a, 136b from one another, with the base body 114 unfolding again.

As an alternative to this, it may, however, also be provided that the material layers 136a, 136b of the base body 114, apart from by the one-piece connection along the fold line 138, are not connected to one another by any further measures (in other words, in particular, neither by a substance-to-substance bond nor non-positively), in particular not by any additional welding.

The folding is carried out geometrically in such a way that one does not, or at least does not substantially fall below the required current cross-section of the cell connector 112.

The cell connector 112 thus produced is connected, preferably by a substance-to-substance bond, in the contact regions 116 and 118, to a respective cell terminal 108 of an electrochemical cell 102.

The contact point 150 of the voltage tap 144 is attached by a means of a connection line (not shown) to an evaluation unit (also not shown) of the electrochemical device 100.

A second embodiment of a cell connector 112 shown in FIGS. 10 to 16 for the electrically conductive connection of a first cell terminal 108a of a first electrochemical cell 102a and a second cell terminal 108b of a second electrochemical cell 102b differs from the first embodiment described above and shown in FIGS. 1 to 9 in that the base body 114 of the cell connector 112 in the second embodiment does not only comprise a first voltage tap 144, which is, for example, connected to the second contact region 118, but additionally a further second voltage tap 160, which is connected to the respective other contact region, in other words to the first contact region 116 in the present embodiment.

As a result it is possible in this second embodiment, to detect and evaluate the electric potentials of the first contact regions 116 (and therefore of the first cell terminal 108a) and the second contact region 118 (and therefore of the second cell terminal 108b) separately from one another.

The second voltage tap 160 is preferably formed in only one of the material layers 136a, 136b of the base body 114 of the cell connector 112.

The second voltage tap 160 is preferably formed in the first material layer 136a facing the cell terminals 108 of the electrochemical cells 102 to be connected to one another.

It is particularly favorable if the first voltage tap 144 and the second voltage tap 160 are formed in the same material layer 136a of the base body 114 of the cell connector 112.

The second voltage tap 160, for example, comprises an initial portion 162, which, extends, for example, in the longitudinal direction 126 away from the first contact region 116 and is spaced apart by a recess 164 from a lateral edge 166 of the first contact region 116 also substantially running in the longitudinal direction 126, and an end portion 168, which preferably extends in the transverse direction 128 of the cell connector 112 and is provided with a contact point 170.

The end portion 168 and the initial portion 162 of the second voltage tap 160 are connected to one another by means of a curved center portion 172.

The contact point 170 of the second voltage tap 160 is connectable to the evaluation unit of the electrochemical device 100 during the assembly of the cell connector 112 by means of a wire (not shown).

Figure 11:
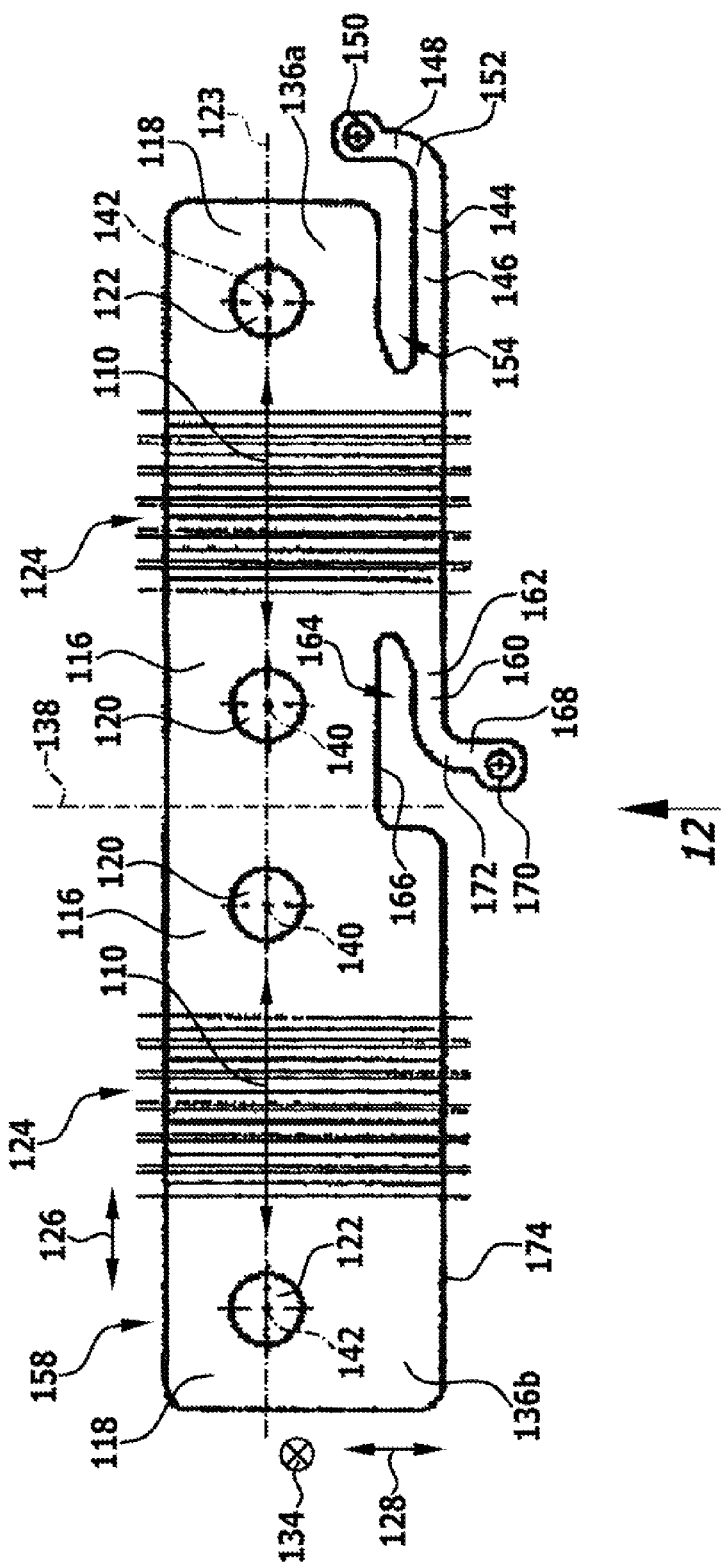
FIG. 11 shows a schematic plan view of a base body blank, from which the base body of the cell connector from FIG. 10 is formed by a folding process.

As can best be seen from FIG. 11, the end portion 168 of the second voltage tap 160 projects in the transverse direction 128 of the cell connector 112 beyond the external contour 174 of the remaining components of the base body 114, in particular the external contour 174 of the contact regions 116 and 118, of the compensation region 124 and the first voltage tap 144.

Figure 10:
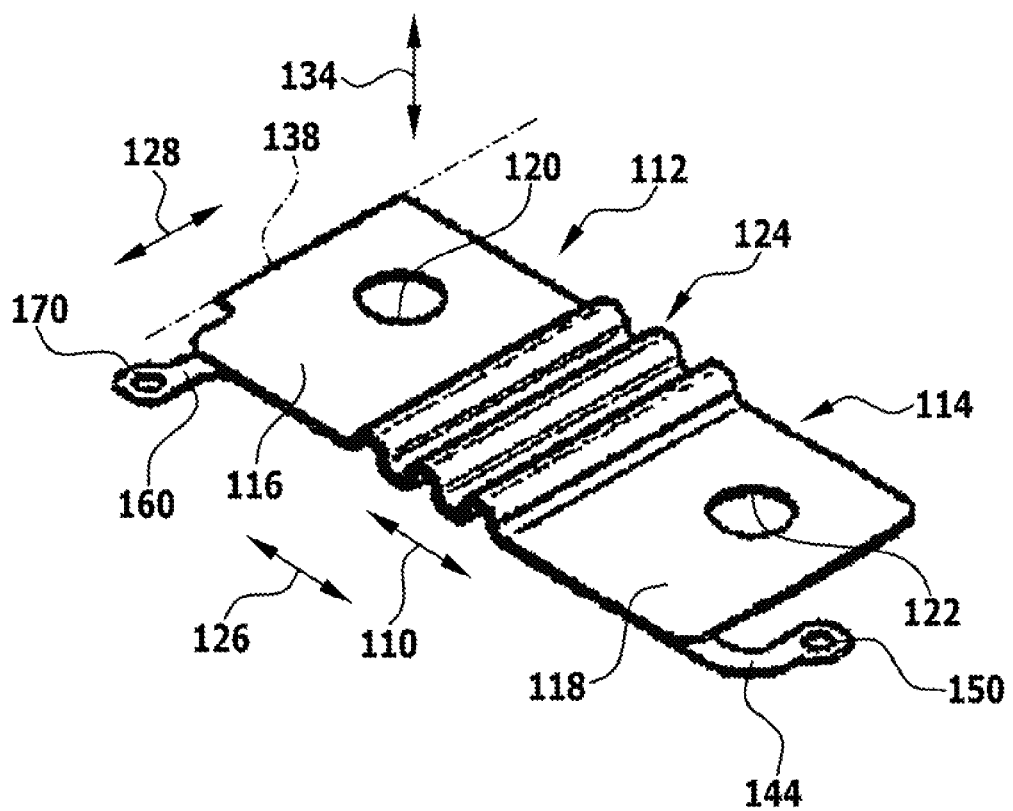
FIG. 10 shows a schematic perspective view of a second embodiment of a cell connector with a base body, which, instead of only one strip-like voltage tap, comprises two strip-like voltage taps, which are associated, in each case, with a contact region of the cell connector.

FIG. 10 shows a perspective view of the finished cell connector 112 of the second embodiment.

Figure 12:
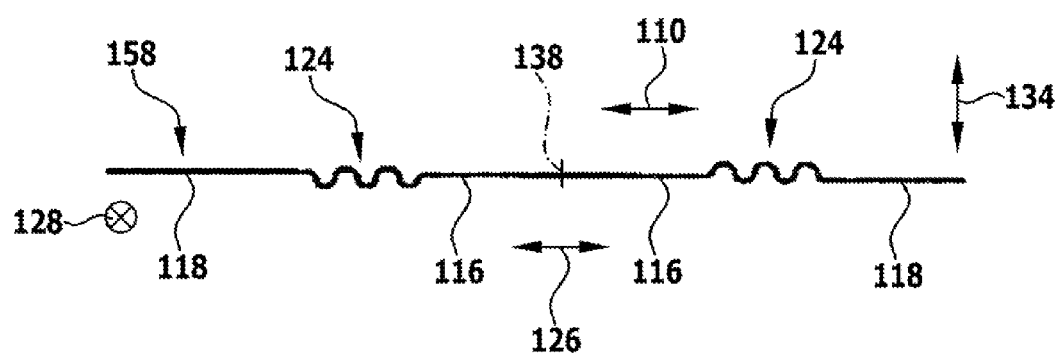
FIG. 12 shows a schematic side view of the base body blank from FIG. 11, with the viewing direction in the direction of the arrow 12 in FIG. 11.
Figure 13:
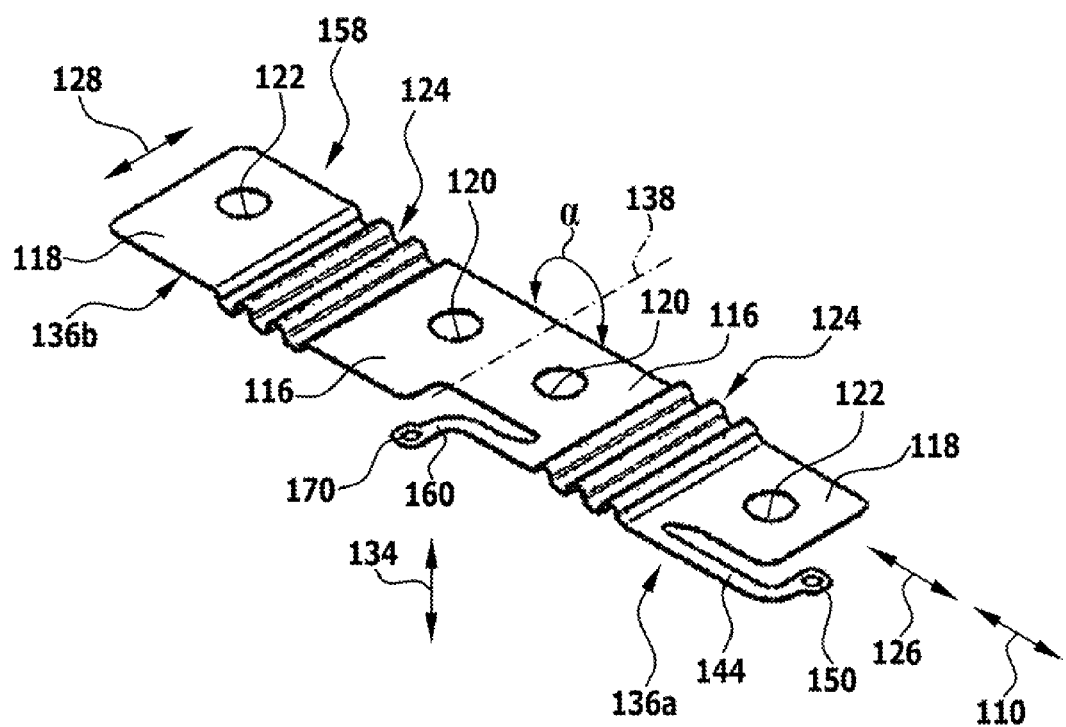
FIG. 13 shows a schematic perspective view of the base body blank from FIGS. 11 and 12.
Figure 14:
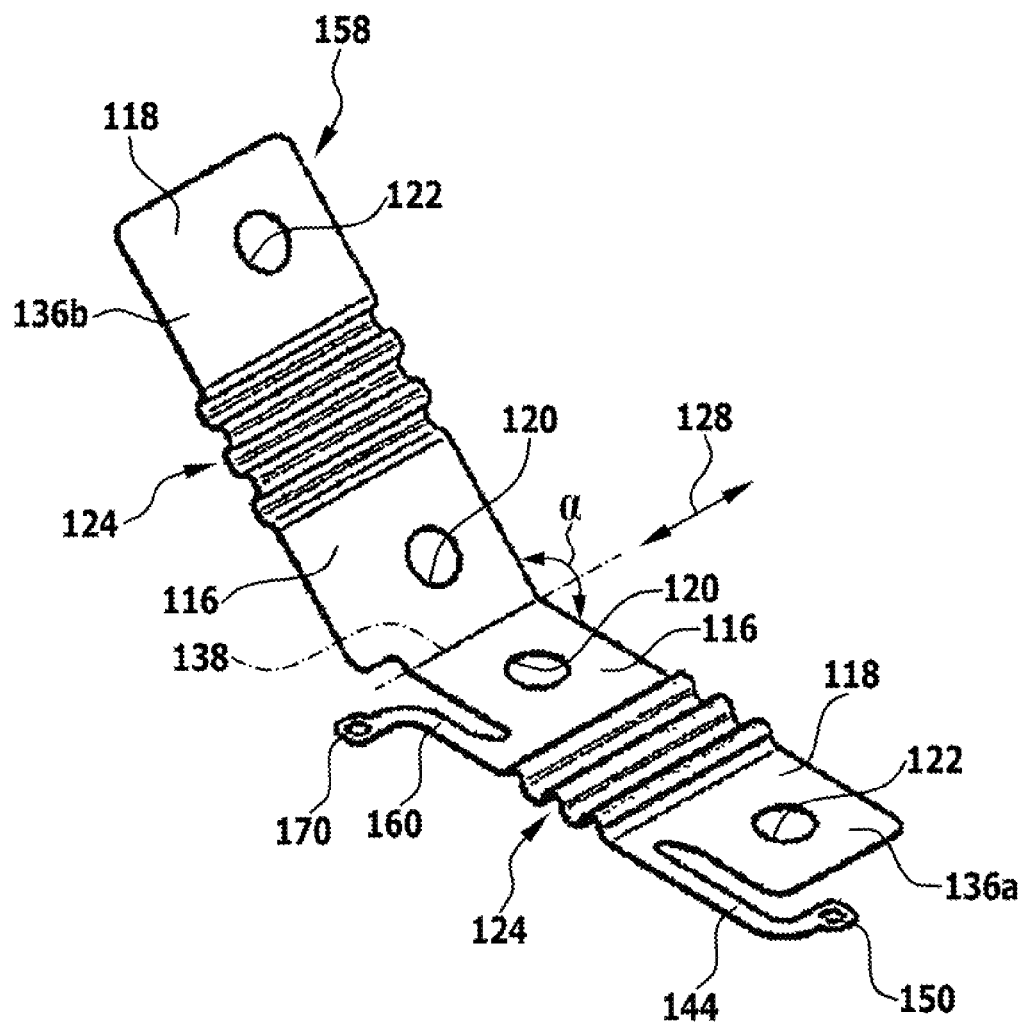
FIGS. 14 to 16 show schematic perspective views of the base body blank from FIGS. 11 to 13 in three consecutive phases of a folding process, by which the cell connector base body according to FIG. 10 is formed from the base body blank according to FIG. 13.
Figure 15:
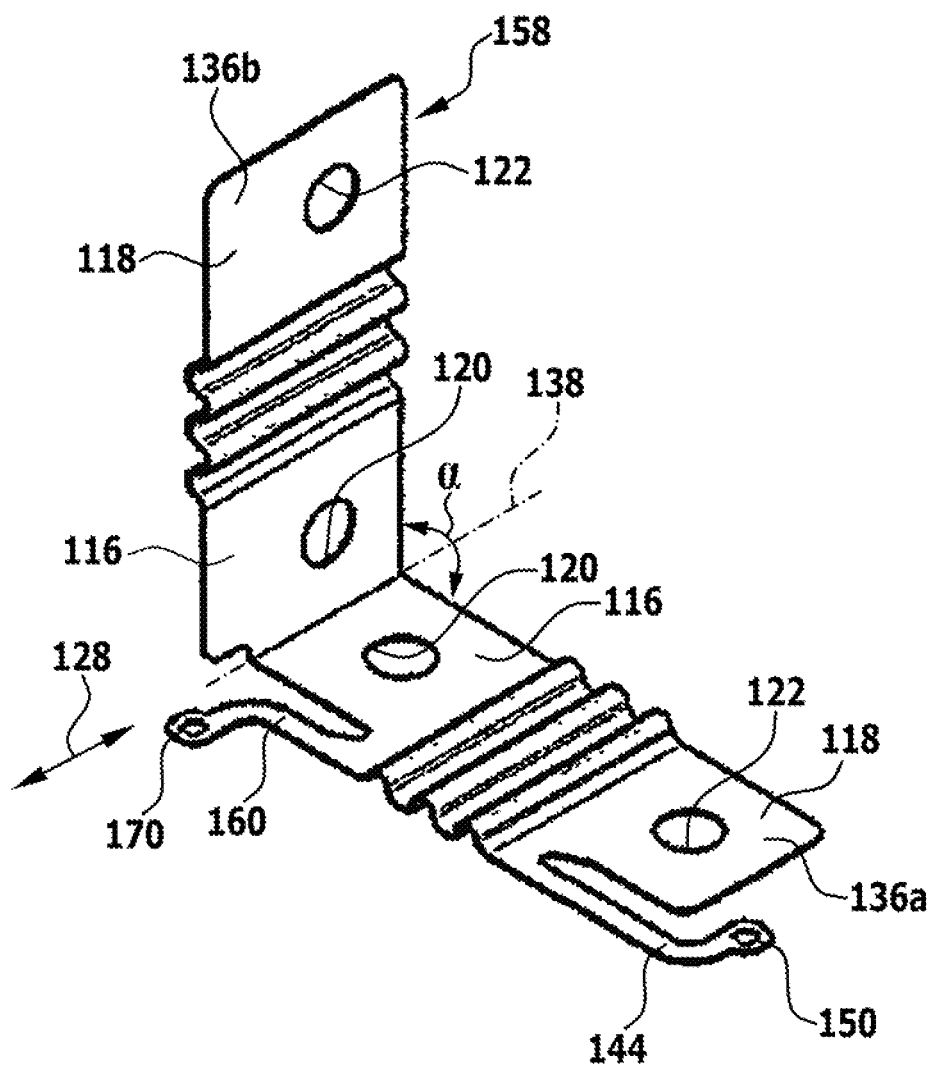
Figure 16:
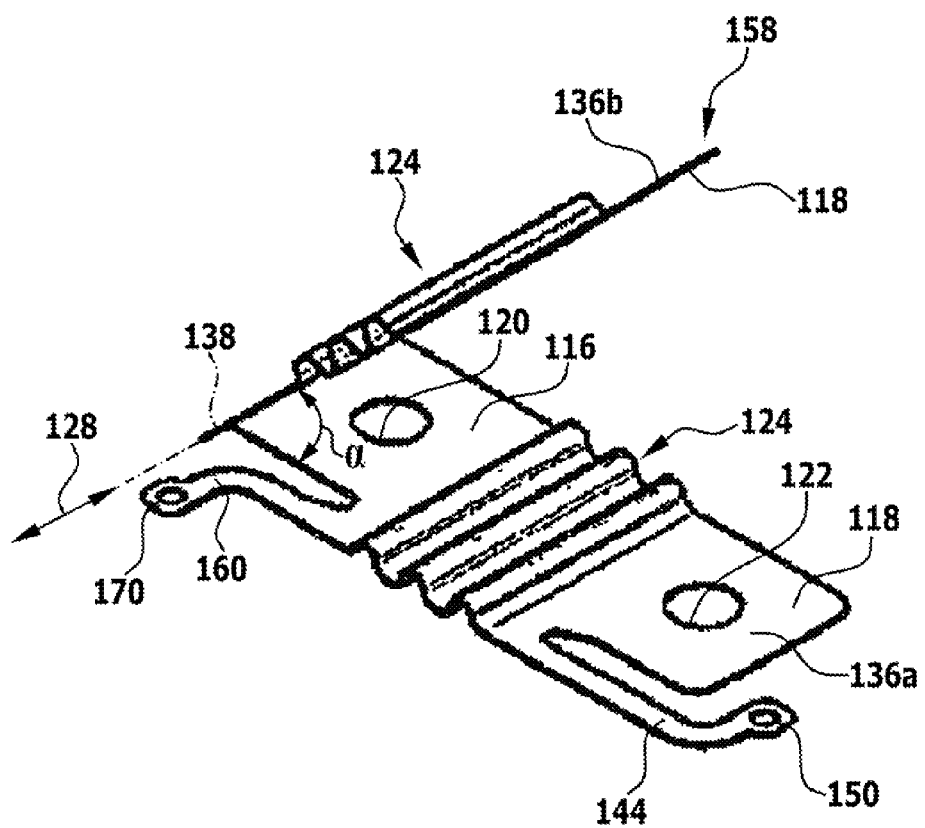

FIGS. 11 to 13 show a base body blank 158, from which the cell connector according to FIG. 10 can be produced by a folding process, of which three consecutive phases are shown in FIGS. 14 to 16.

Otherwise, the second embodiment shown in FIGS. 10 to 16 of a cell connector 112 coincides with respect to structure, function and mode of production with the first embodiment shown in FIGS. 1 to 9, to the above description of which reference is to this extent made.

A third embodiment of a cell connector 112 shown in FIGS. 17 to 23 differs from the two first embodiments shown in FIGS. 1 to 16 in that the fold line 138, along which the first material layer 136a and the second material layer 136b are connected to one another in one piece, does not run parallel to the transverse direction 128 of the cell connector 112, but instead substantially parallel to the longitudinal direction 126 and therefore substantially parallel to the connection direction 110 of the cell connector 110.

Figure 17:
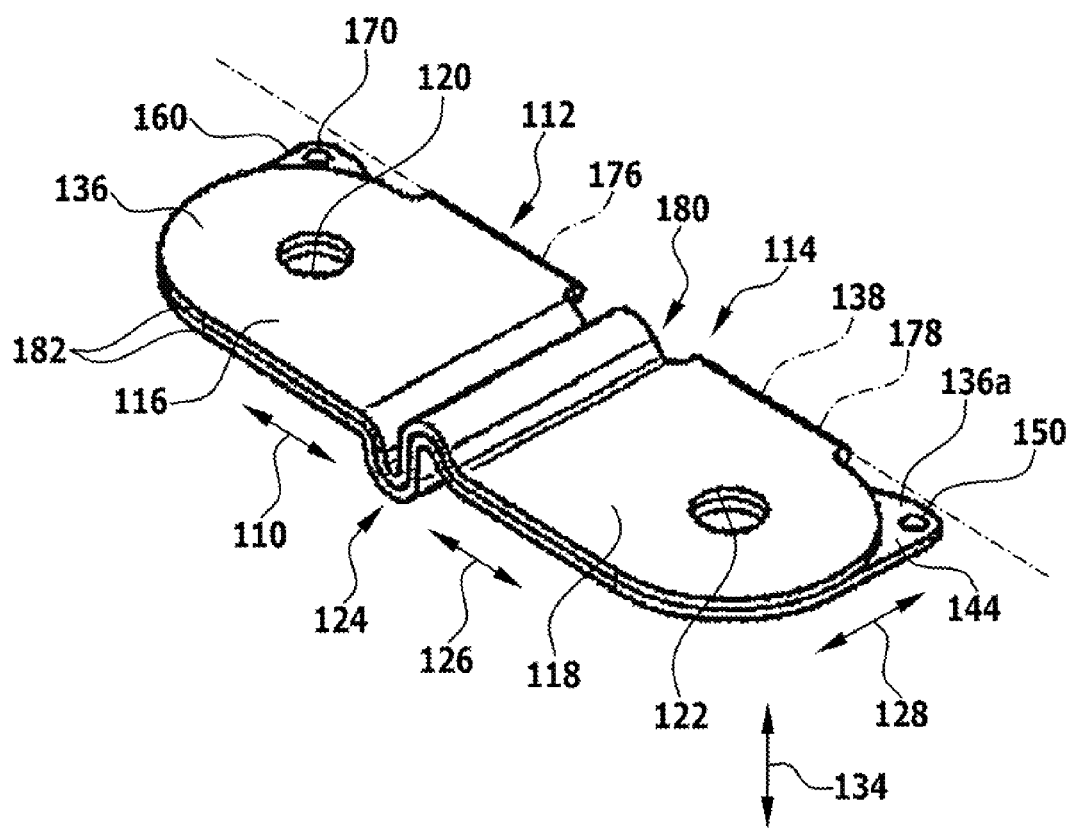
FIG. 17 shows a schematic perspective view of a third embodiment of a cell connector with a base body, which is formed by folding along a fold line running parallel to a connection direction of the cell connector, from a base body blank.

FIG. 17 shows a perspective view of the finished cell connector 112 according to the third embodiment.

Figure 18:
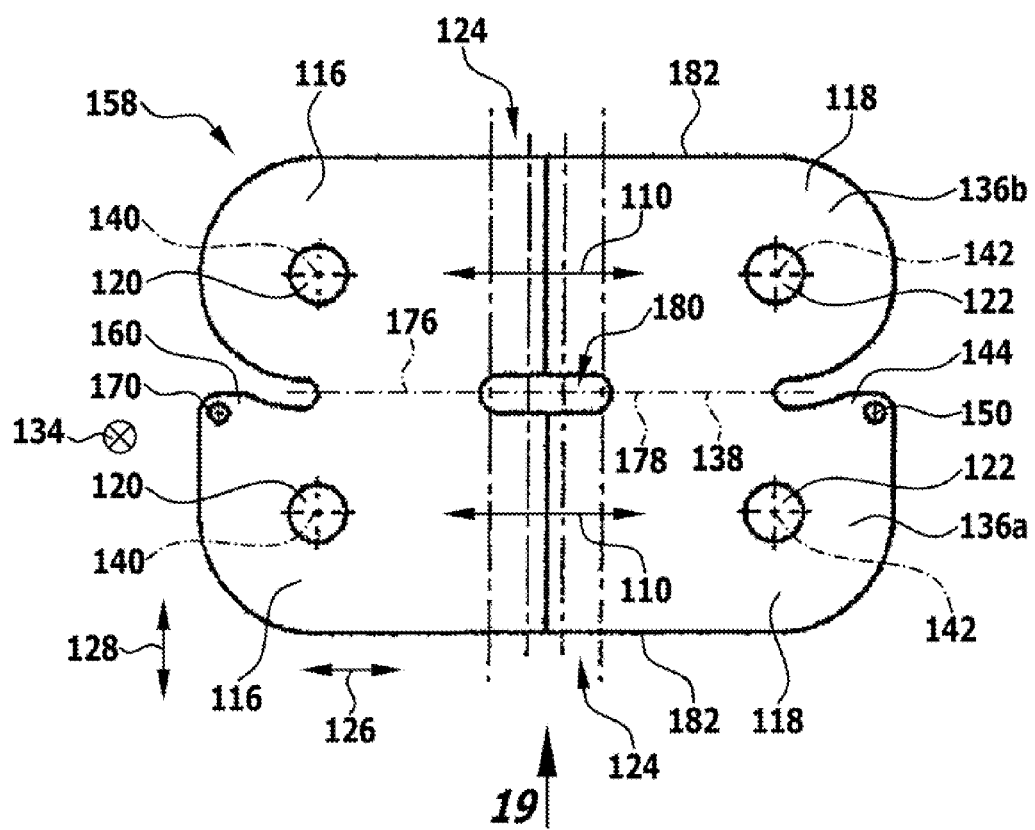
FIG. 18 shows a schematic plan view of a base body blank of the cell connector from FIG. 17.
Figure 19:
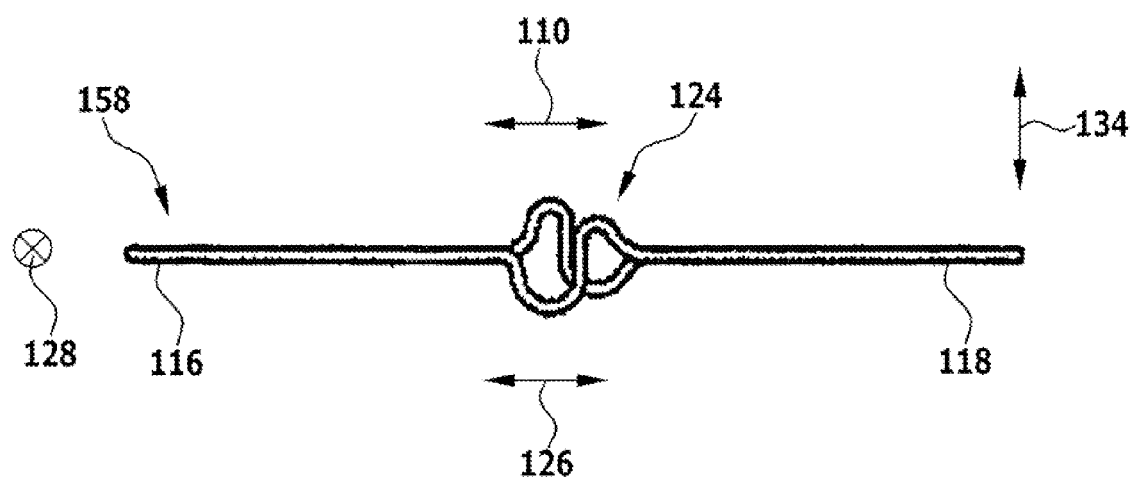
FIG. 19 shows a schematic side view of the base body blank from FIG. 18, with the viewing direction in the direction of the arrow 19 in FIG. 18.
Figure 20:
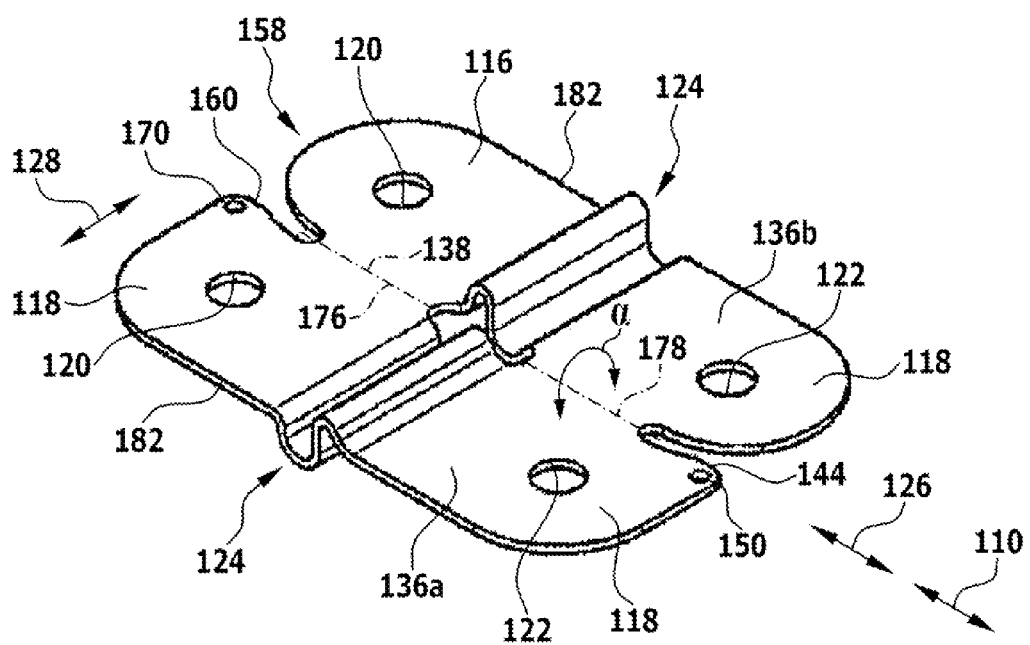
FIG. 20 shows a schematic perspective view of the base body blank from FIGS. 18 and 19.
Figure 21:
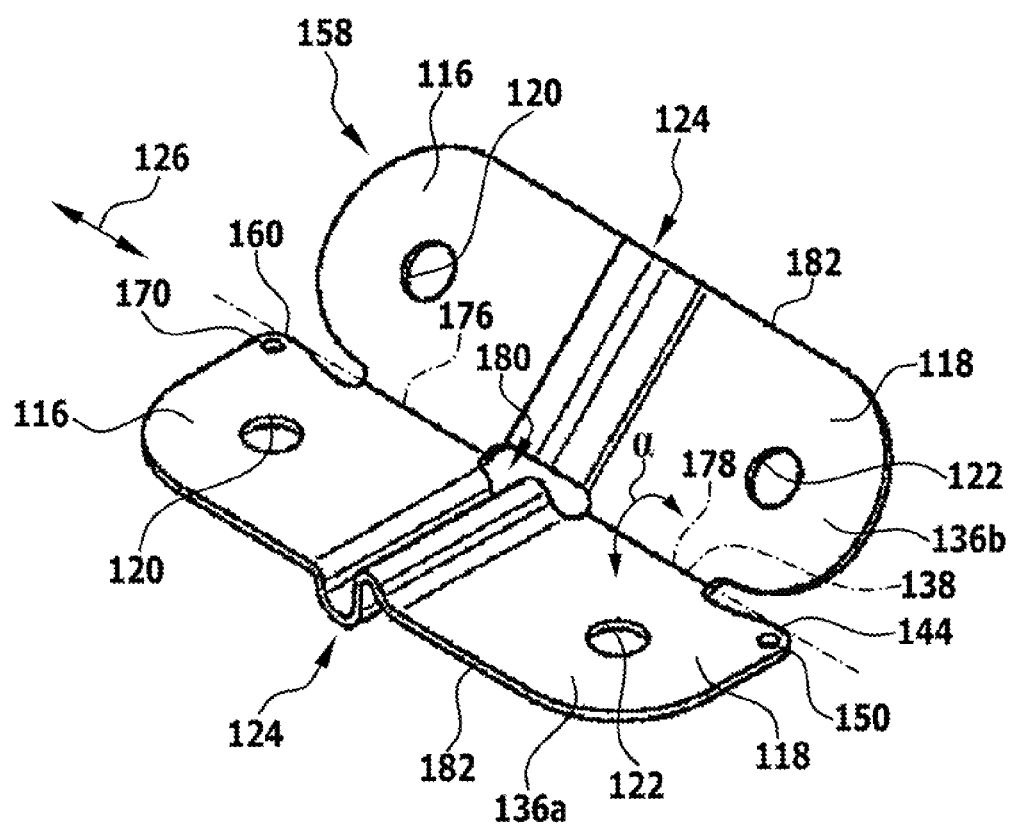
FIGS. 21 to 23 show schematic perspective views of the base body blank from FIG. 20 in three consecutive phases of a folding process, by which the cell connector base body according to FIG. 17 is formed from the base body blank according to FIG. 20.
Figure 22:
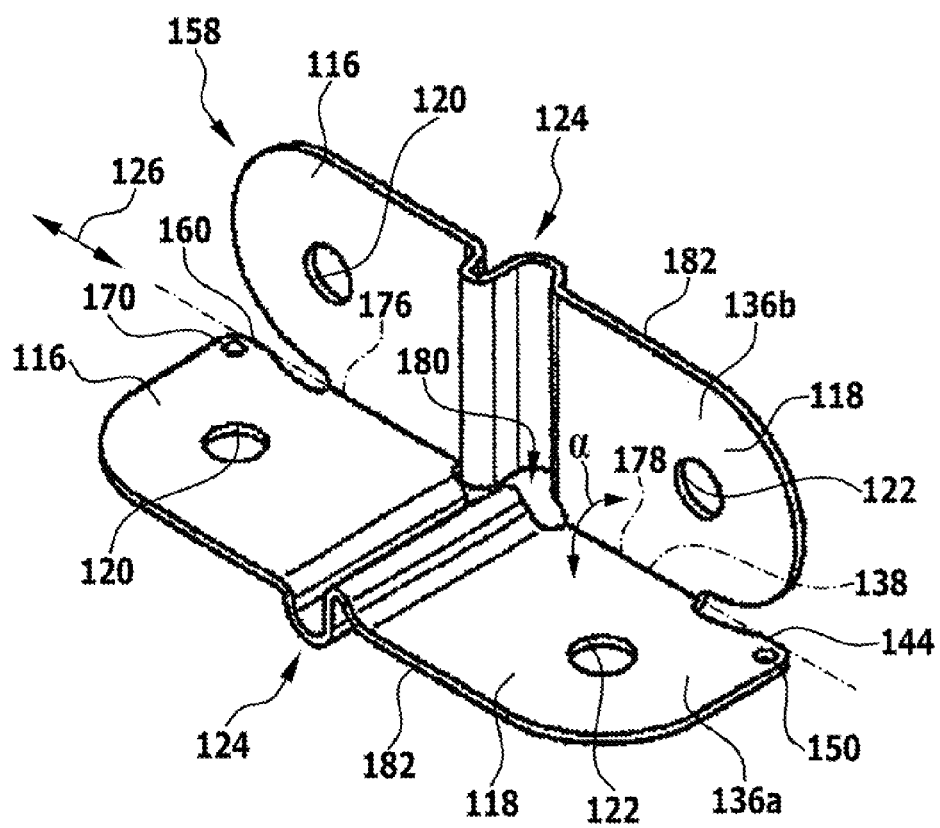
Figure 23:
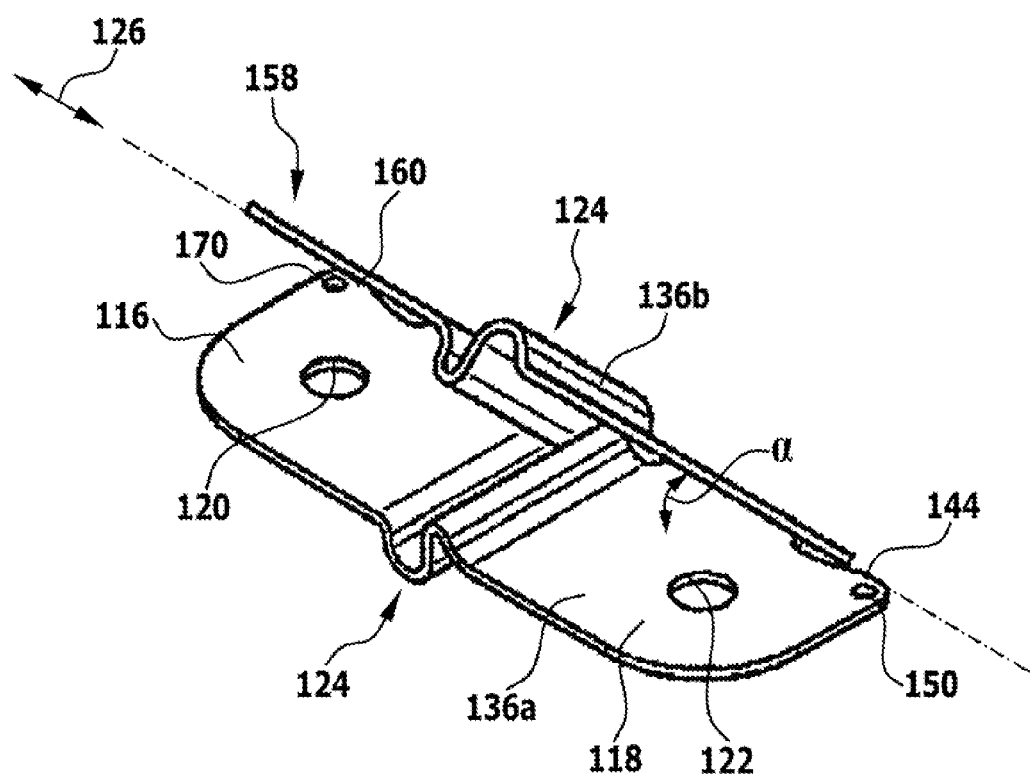

FIGS. 18 to 20 show a base body blank 158, from which the base body 114 according to FIG. 17 is producible by a folding process, of which three consecutive phases are shown in FIGS. 21 to 23.

As can best be seen from FIG. 18, the fold line 138 in this embodiment comprises a first portion 176, which runs between the first contact region 116 of the first material layer 136a and the first contact region 116 of the second material layer 136b, and a second portion 178, which runs between the second contact region 118 of the first material layer 136a and a second contact region 118 of the second material layer 136b.

The two portions 176 and 178 of the fold line 138 are separated from one another in this embodiment by a recess 180 lying between them.

The recess 180 in the region of the compensation region 124 of the cell connector 112 allows the compensation regions 124, which lie next to one another, of the first material layer 136a and of the second material layer 136b to be configured in a complementary manner with respect to one another (see, in particular, the side view of the base body blank 158 in FIG. 19).

In the third embodiment shown in FIGS. 17 to 23, the compensation region 124 does not have a plurality of, but only one respective corrugation peak 130 and does not have a plurality of, but only one respective corrugation trough 132.

Basically, the number of troughs in the compensation region 124 is, however, arbitrary so the third embodiment shown in FIGS. 17 to 23 can also be provided with a larger number of corrugations and the embodiments shown in FIGS. 1 to 16 of a cell connector 112 can also be provided with a smaller (or a still larger) number of corrugations in the compensation region 124.

A further difference between the third embodiment shown in FIGS. 17 to 23 and the two embodiments shown in FIGS. 1 to 16 is that the contact regions 116 and 118 in the third embodiment have larger radii of curvature in their corner regions, so the cell connector 112 as a whole receives an approximately oval external contour.

However, a contact region 116, 118 with a smaller radius of curvature can basically also be combined with a fold line 138 running parallel to the longitudinal direction 126, and a contact region with a larger radius of curvature can basically also be combined with a fold line 138 running parallel to the transverse direction 128 of the cell connector 112.

Finally, the voltage taps 144 and 160 of the cell connector 112 in the third embodiment shown in FIGS. 17 to 23 are not strip-like, but form corner regions of the contact regions 116, 118, which project beyond the external contour of the respective other material layer 136b, of a material layer 136a of the base body 114.

The first voltage tap 144 and/or the second voltage tap 160 are preferably arranged on the first material layer 136a, which, in the assembled state of the cell connector 112, faces the cell terminals 108 to be connected to one another of the electrochemical cells 102.

It is particularly favorable if the two voltage taps 144 and 160 are provided on the same material layer, preferably on the first material layer 136a.

The contact points 150 of the voltage taps 144 and 160 are attached during the assembly of the cell connector 112 by means of wires (not shown) to an evaluation unit (not shown) of the electrochemical device 100 in order to be able to detect and evaluate the electric potentials of the first contact region 116 and of the second contact region 118 during operation of the electrochemical device 100.

To produce the third embodiment of a cell connector 112, the base body blank 158 shown in FIGS. 18 to 20 is firstly separated out, for example stamped out or cut out (for example by means of a laser) from a starting material, for example from a starting material in the form of sheet metal.

In the base body blank 158, the two material layers 136a and 136b lie next to one another in the same plane, along the later fold line 138.

The corrugation peaks 130 and corrugation troughs 132 of the respective compensation regions 124 are introduced into the material layers 136a, 136b of the base body blank 158 by a suitable forming processes, in particular embossing or deep drawing processes.

Before or after this forming process, the through-openings 120 and 122 are introduced into the contact regions 116 or 118 of the material layers 136a or 136b of the base body blank 158.

The base body 114 of the cell connector 112 shown in FIG. 17 is then produced from the base body blank 158 shown in FIG. 20 by a folding process, in which one of the material layers, for example the second material layer 136b, is folded about the fold line 138 in such a way that the angle α included by the material layers 136a and 136b of initially 180° is reduced to 0° and the two material layers 136a, 136b finally lie substantially flat on one another.

In the phases, which follow one another in time, of the folding process, which are shown in FIGS. 21 to 23, the angle α included by the material layers 136a, 136b is in each case 135° (FIG. 21), 90° (FIG. 22) and 45° (FIG. 23).

Basically it is possible to connect the two material layers 136a and 136b to one another after the folding process by a further measure, for example by welding, in addition to the one-piece connection along the fold line 138, in order to avoid the base body 114 unintentionally unfolding again.

As, because of the course of the fold line 138 parallel to the longitudinal direction 126 of the cell connector 112, the spacing of the free edges 182 of the material layers 136a, 136b from the fold line 138 is relatively small, however, in particular smaller than the total extent of the fold line 138 in the longitudinal direction 126 of the cell connector 112, such additional measures for connecting the two material layers 136a, 136b to one another can, however, be dispensed with.

The material layers 136a, 136b of the base body 114 of the cell connector 112, in addition to the one-piece connection along the fold line 138, are preferably therefore not connected to one another by any further measure (in other words, in particular, neither with a substance-to-substance bond nor non-positively).

The finished base body 114 according to FIG. 17 is then connected, preferably with a substance-to-substance bond, to the cell terminals 108 of the electrochemical cells 102 to be connected to one another.

Otherwise, the third embodiment of a cell connector 112 shown in FIGS. 17 to 23 coincides with respect to structure, function and mode of production to the embodiments shown in FIGS. 1 to 16, to the above description of which references to this extent are made.

A fourth embodiment of a cell connector 112 shown in FIGS. 24 to 31 differs from the third embodiment shown in FIGS. 17 to 23 in that the second material layer 136b is not formed in one piece, but is divided along a separating line 186 into two material layers 184a and 184b, which, in each case, are connected in one piece to the first material layer 136a of the base body 114 along fold lines 138a or 138b that are different from one another.

In this case, the separating line 186 and the two fold lines 138a and 138b preferably run substantially parallel to the longitudinal direction 126 and therefore substantially parallel to the connection direction 110 of the cell connector 112.

Figure 24:
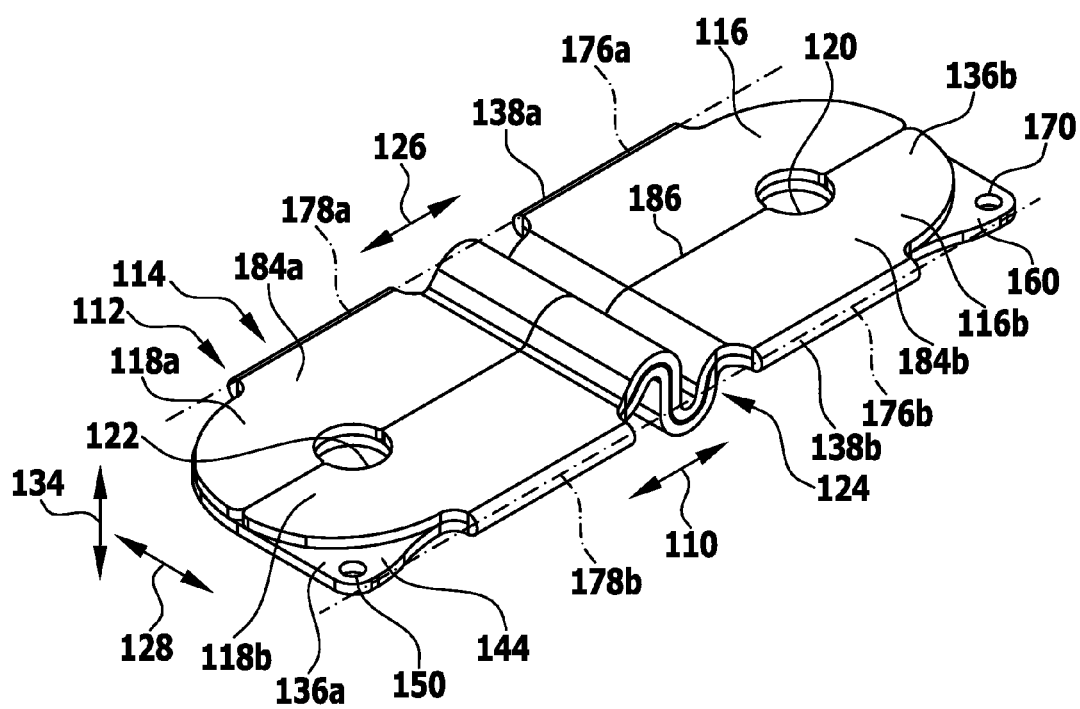
FIG. 24 shows a schematic perspective view of a fourth embodiment of a cell connector with a base body, which comprises a divided material layer, which, in turn, comprises at least two part material layers, which are connected in one piece to another material layer of the base body along fold lines that are different from one another.

FIG. 24 shows a perspective view of the finished cell connector 112 according to the fourth embodiment.

Figure 25:
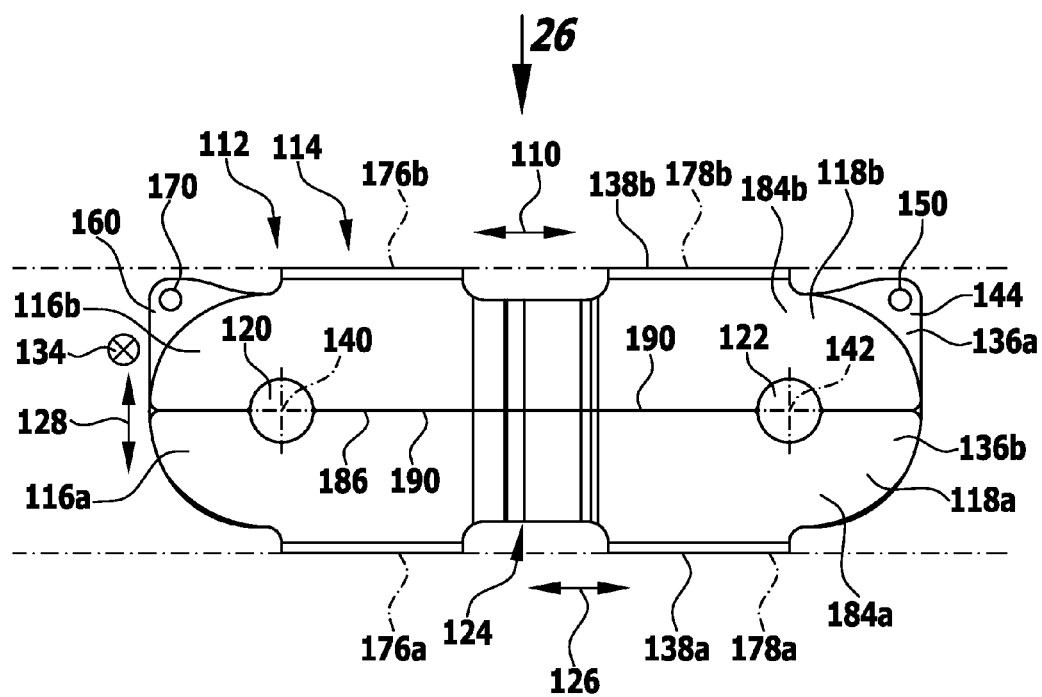
FIG. 25 shows a schematic plan view from above of the cell connector from FIG. 24.

FIG. 25 shows a plan view from above of the finished cell connector 112 according to the fourth embodiment.

Figure 26:
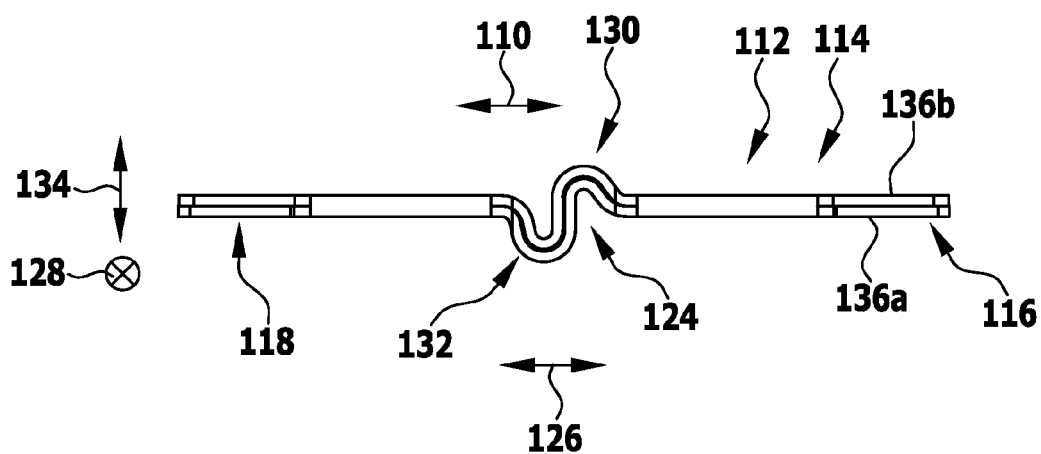
FIG. 26 shows a schematic side view of the cell connector from FIG. 24 and FIG. 25, with the viewing direction in the direction of the arrow 26 in FIG. 25.

FIG. 26 shows a side view of the finished cell connector 112 according to the fourth embodiment.

Figure 27:
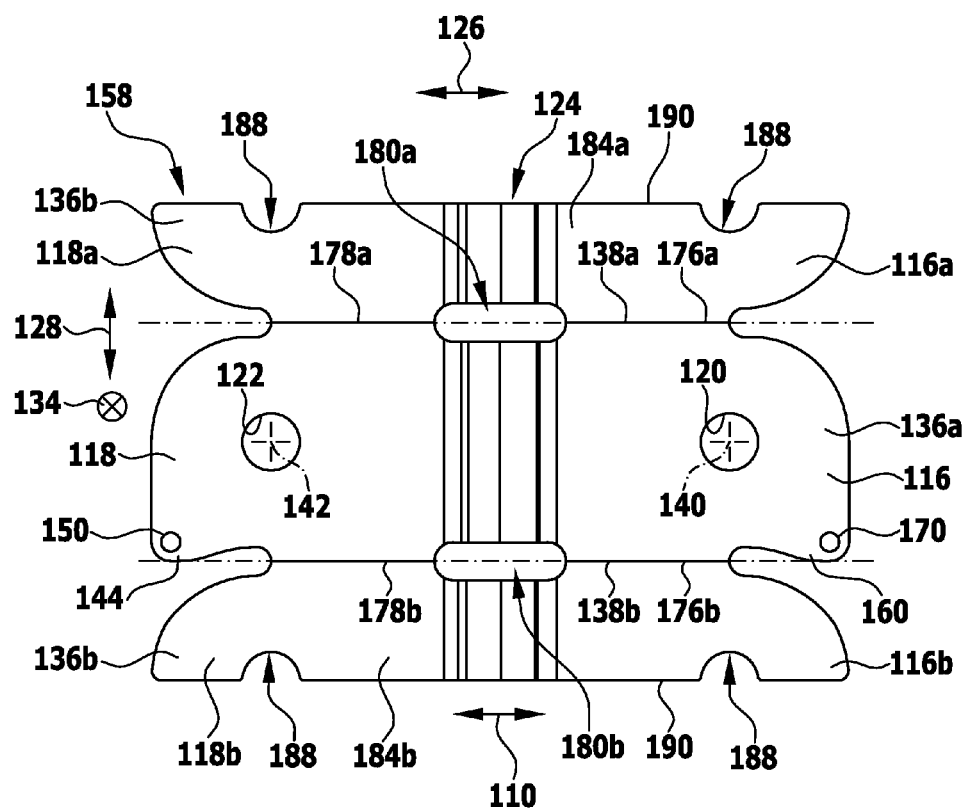
FIG. 27 shows a schematic plan view of a base body blank of the cell connector from FIG. 24.
Figure 28:
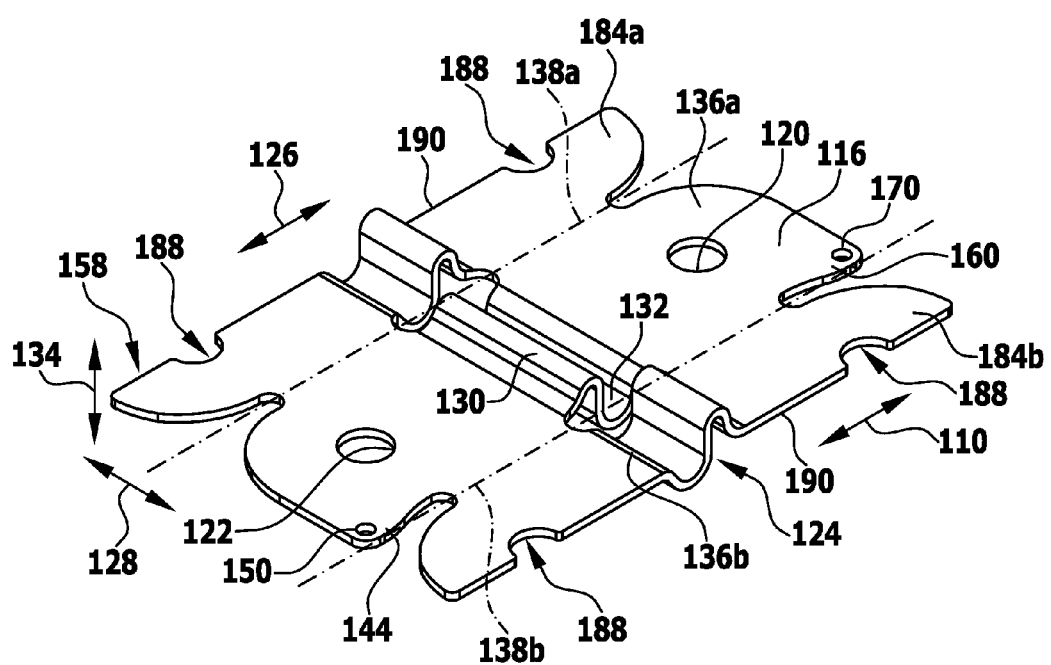
FIG. 28 shows a schematic perspective view of the base body blank from FIG. 27.
Figure 29:
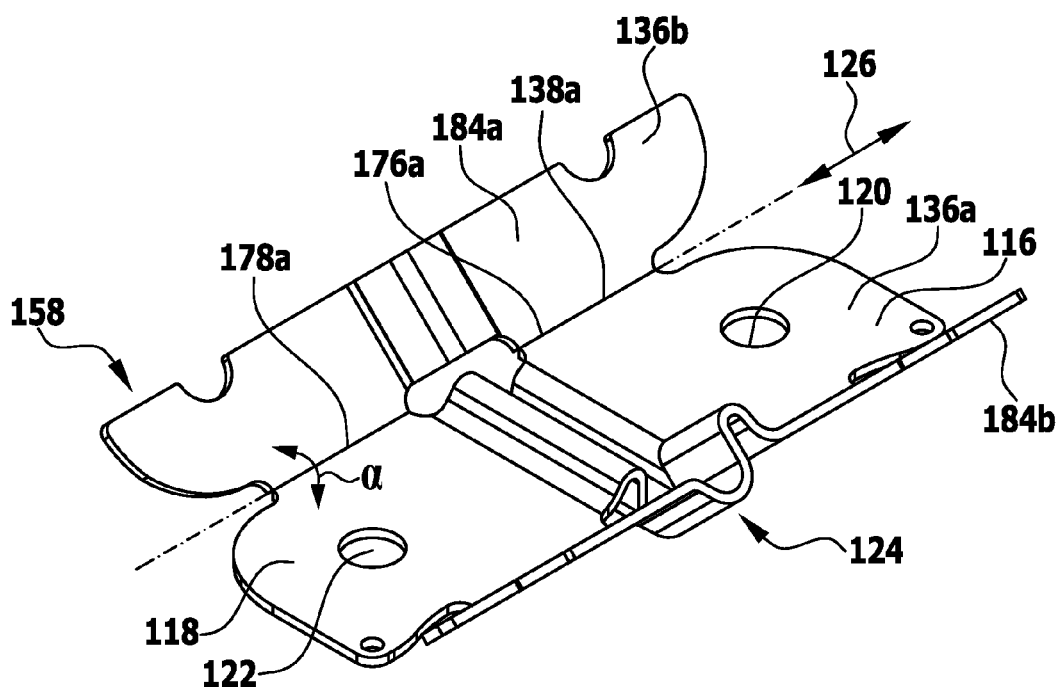
FIGS. 29 to 31 show schematic perspective views of the base body blank from FIG. 28 in three consecutive phases of a folding process, by which the cell connector base body according to FIG. 24 is formed from the base body blank according to FIG. 28.
Figure 30:
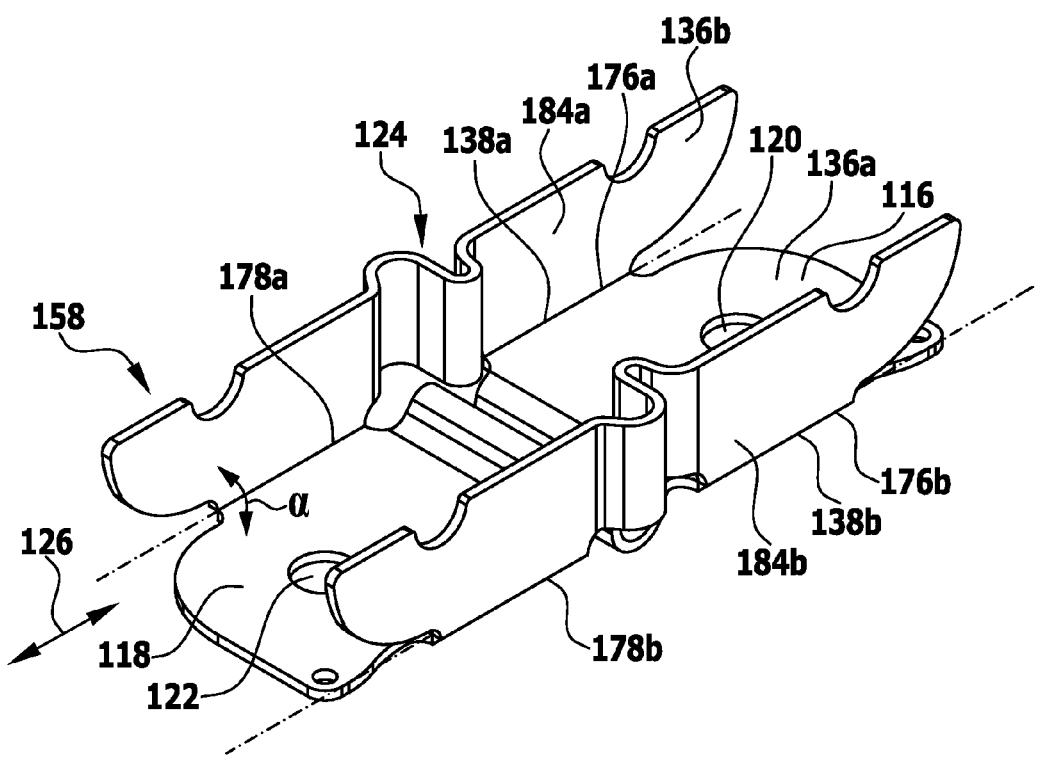
Figure 31:
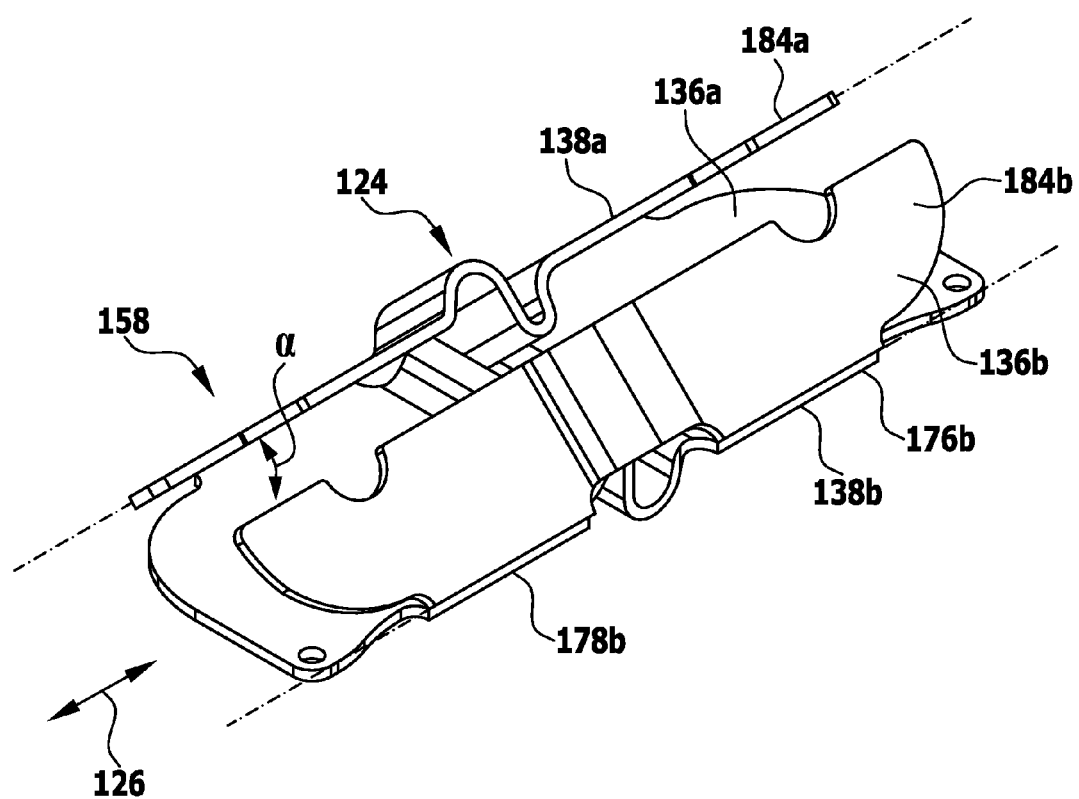

FIGS. 27 and 28 show a base body blank 158, from which the base body 114 according to FIGS. 24 to 26 is producible by a folding process, of which three consecutive phases are shown in FIGS. 29 to 31.

As can best be seen from FIG. 27, the first fold line 138a in this embodiment comprises a first portion 176a, which runs between the first contact region 116 of the first material layer 136a and a first part contact region 116a of the first part material layer 184a of the second material layer 136b, and a second portion 178a, which runs between the second contact region 118 of the first material layer 136a and a second part contact region 118a of the first part material layer 184a of the second material layer 136b.

The two portions 176a and 178a of the first fold line 138a are separated from one another in this embodiment by a recess 180a lying between them.

The recess 180a in the region of the compensation region 124 of the cell connector 120 makes it possible for the compensation regions 124 lying next to one another of the first material layer 136a and of the first part material layer 184a of the second material layer 136b to be complementary to one another.

In the fourth embodiment shown in FIGS. 24 to 31, the compensation region 124 does not have a plurality of, but only one respective corrugation peak 130 and does not have a plurality of, but only one respective corrugation tough 132.

Basically, the number of corrugation compensation regions or corrugations of the compensation regions 124 is, however, arbitrary, so the fourth embodiment shown in FIGS. 24 to 31 can also be provided with a larger number of corrugations.

The second fold line 138b in this embodiment comprises a first portion 176b, which runs between the first contact region 116 of the first material layer 136a and a first part contact region 116b of the second part material layer 184b of the second material layer 136b, and a second portion 178b, which runs between the second contact region 118 of the first material layer 136a and a second part contact region 118b of the second part material 184b of the second material layer 136b.

The two portions 176b and 178b of the second fold line 138b are separated from one another in this embodiment by a recess 180b lying between them.

The recess 180b in the region of the compensation region 124 of the cell connector 112 allows the compensation regions 124 lying next to one another of the first material layer 136a and of the second part material layer 184b of the second material layer 186 to be complementary to one another.

As, in this fourth embodiment of the cell connector 112, the separating line 186 of the second material layer 136b runs through the center 140 of the first contact region 116 and the center 142 of the second contact region 118 of the second material layer 136b, the first through-opening 120 of the first contact region 116 and the second through-opening 122 of the second contact region 118 of the second material layer 136b in the base body blank 158 do not form any holes with a closed edge, but, for example substantially semi-circular recesses 188 on the free edges 190 of the two part material layers 184a, 184b, which oppose the respective fold line 138a or 138b.

To produce the fourth embodiment of a cell connector 112, the base body blank 158 shown in FIGS. 27 and 28 is firstly separated out, for example stamped out or cut out (for example by means of a laser) from a starting material, for example from a starting material in the form of sheet metal.

In the base body blank 158, the first material layer 136a and the two part material layers 184a, 184b of the second material layer 136b lie next to one another in the same plane, along the later fold lines 138a and 138b.

The corrugation peaks 130 and corrugation troughs 132 of the respective compensation regions 124 are introduced into the material layer 136a and the part material layers 184a, 184b of the base body blank 158 by suitable forming processes, in particular embossing or deep drawing processes.

Before or after this forming process, the through-openings 120 and 122 are introduced into the contact regions 116 or 118 of the material layer 136a of the base body blank 158.

The base body 114 shown in FIGS. 24 to 26 of the cell connector 112 is then produced from the base body blank 158 shown in FIGS. 27 and 28 by a folding process, in which the two part material layers 184a, 184b of the second material layer 136b are folded about the respectively associated fold line 138a or 138b in such a way that the angle α included by the material layer 136a on the one hand and the part material layers 184a, 184b, on the other hand, of firstly 180° is reduced to 0° and the first material layer 136a and the two part material layers 184a, 184b of the second material layer 136b finally lie substantially flat on one another.

In the phases following one another in time of the folding process, which are shown in FIGS. 29 to 31, the angle α included by the first material layer 136a, on the one hand, and the part material layers 184a or 184b, on the other hand, is, in each case, 135° (FIG. 29), 90° (FIG. 30) or 45° (FIG. 31).

In the finished base body 114 of the cell connector 112 (see FIGS. 24 to 26), the free edges 190 of the part material layers 184a, 184b of the second material layer 136 lie on one another along the separating line 186 or oppose one another with a small spacing.

Basically, it is possible to connect the material layer 136a and the part material layers 184a, 184b to one another after the folding process by a further measure, for example by welding and/or by mechanical clamping, in addition to the one-piece connection along the fold lines 138a, 138b in order to avoid the base body 114 unintentionally unfolding again.

As, because of the course of the fold lines 138a and 138b parallel to the longitudinal direction 126 of the cell connector 112, the spacing of the free edges 190 of the part material layers 184a and 184b from the respective fold line 138a or 138b is relatively small, however, in particular is smaller than the entire extent of the fold lines 138a and 138b in the longitudinal direction 126 of the cell connector 112, such additional measures for connecting the material layer 136a to the part material layers 184a and 184b to one another can, however, be dispensed with.

The material layer 136a and the part material layers 184a, 184b of the base body 114 of the cell connector 112, apart from the one-piece connection along the fold lines 138a and 138b, are therefore not connected to one another by any further measure (in other words, in particular neither with a substance-to-substance bond nor non-positively).

The finished base body 114 according to FIGS. 24 to 26 is then connected, preferably with a substance-to-substance bond, to the cell terminals 108 of the electrochemical cells 102 to be connected to one another.

Otherwise, the fourth embodiment of a cell connector 112 shown in FIGS. 24 to 31 coincides with respect to structure, function and mode of production with the third embodiment shown in FIGS. 17 to 23, to the above description of which reference to this extent is made.

A fifth embodiment of a cell connector 112 shown in FIGS. 32 to 39 differs from the third embodiment shown in FIGS. 17 to 23 in that the first material layer 136a is not only connected in one piece to the second material layer 136b along a fold line, but is connected in one piece to the second material layer 136*b* along a first fold line 138*a* and connected in one piece along a second fold line 138*b* to a third material layer 136*c* of the base body 114.

In this case, the two fold lines 138*a* and 138*b* preferably run substantially parallel to the longitudinal direction 126 and therefore substantially parallel to the connection direction 110 of the cell connector 112.

Figure 32:
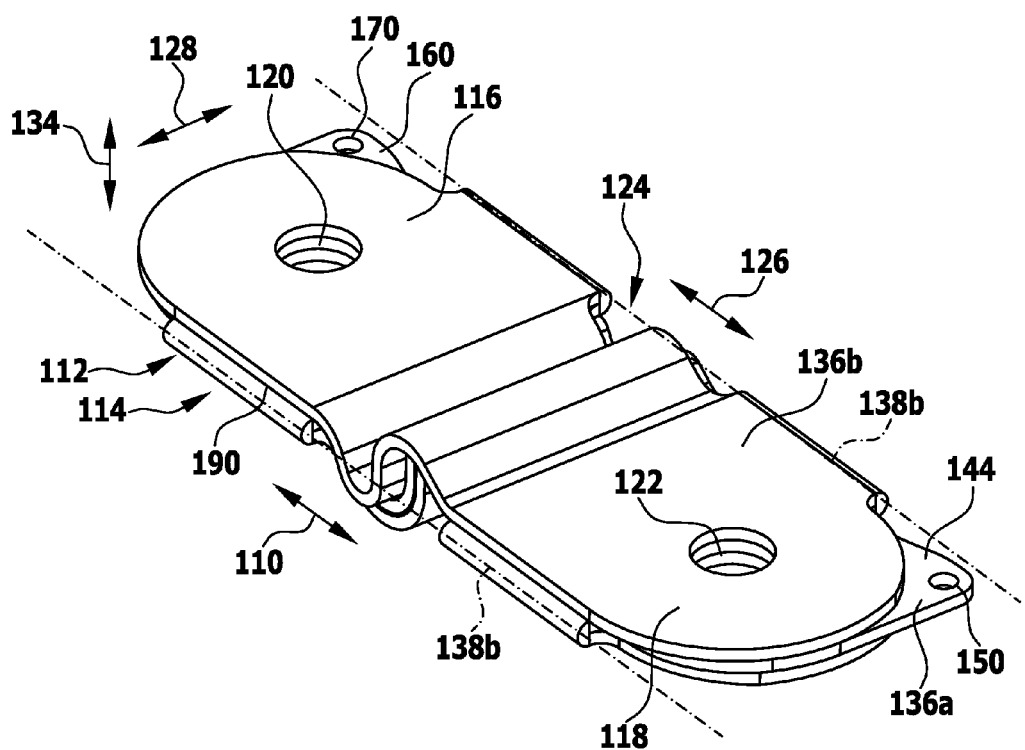
FIG. 32 shows a schematic perspective view of a fifth embodiment of a cell connector with a base body, which comprises a central material layer, which is connected in one piece to two other material layers of the base body along fold lines that are different from one another.

FIG. 32 shows a perspective view of the finished cell connector 112 according to the fifth embodiment, which therefore comprises three material layers 136*a*, 136*b* and 136*c*.

Figure 33:
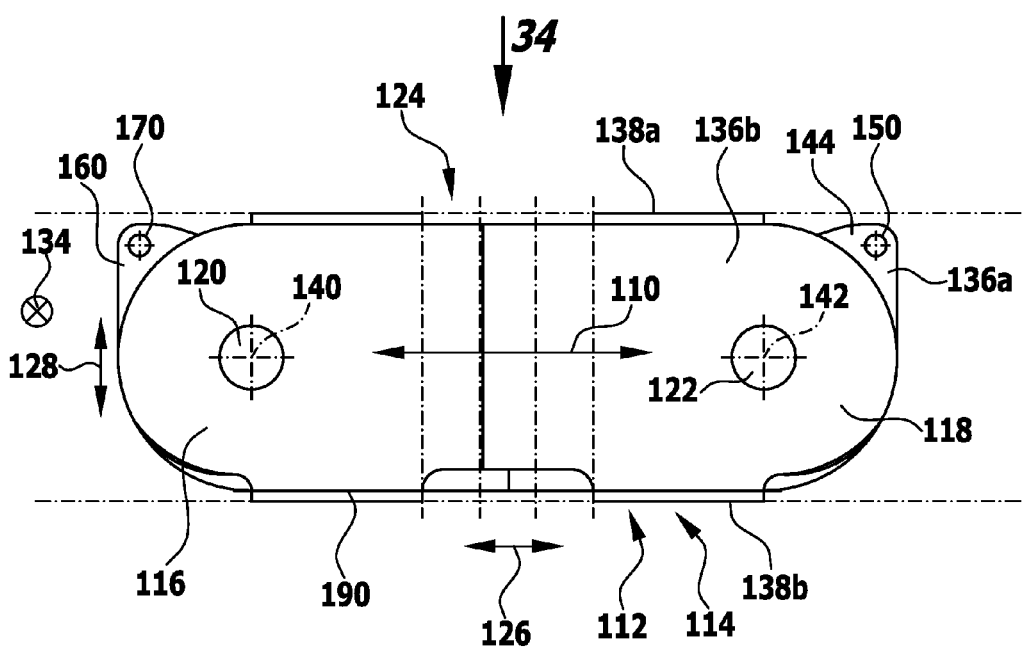
FIG. 33 shows a schematic plan view from above of the cell connector from FIG. 32.

FIG. 33 shows a plan view from above of the finished cell connector 112 according to the fifth embodiment.

Figure 34:
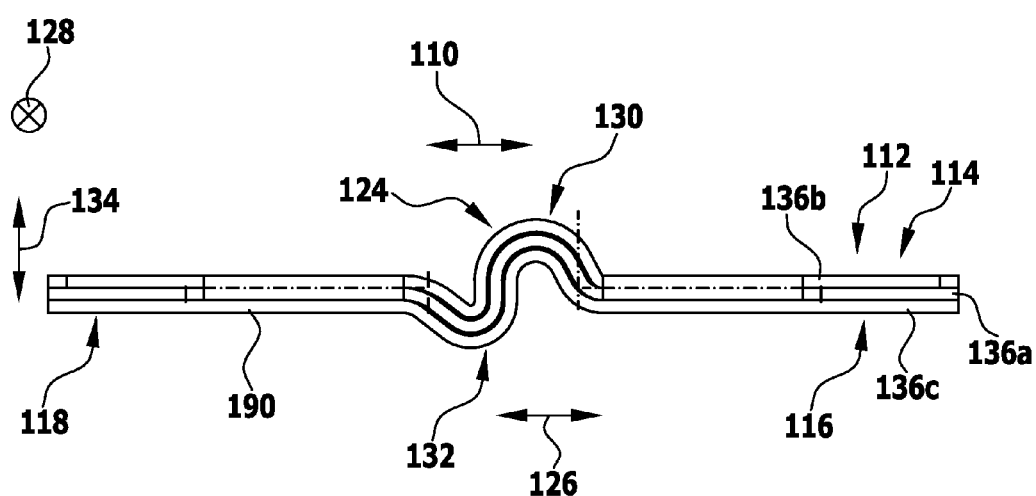
FIG. 34 shows a schematic side view of the cell connector from FIGS. 32 and 33, with the viewing direction in the direction of the arrow 34 in FIG. 33.

FIG. 34 shows a side view of the finished cell connector 112 according to the fifth embodiment.

Figure 35:
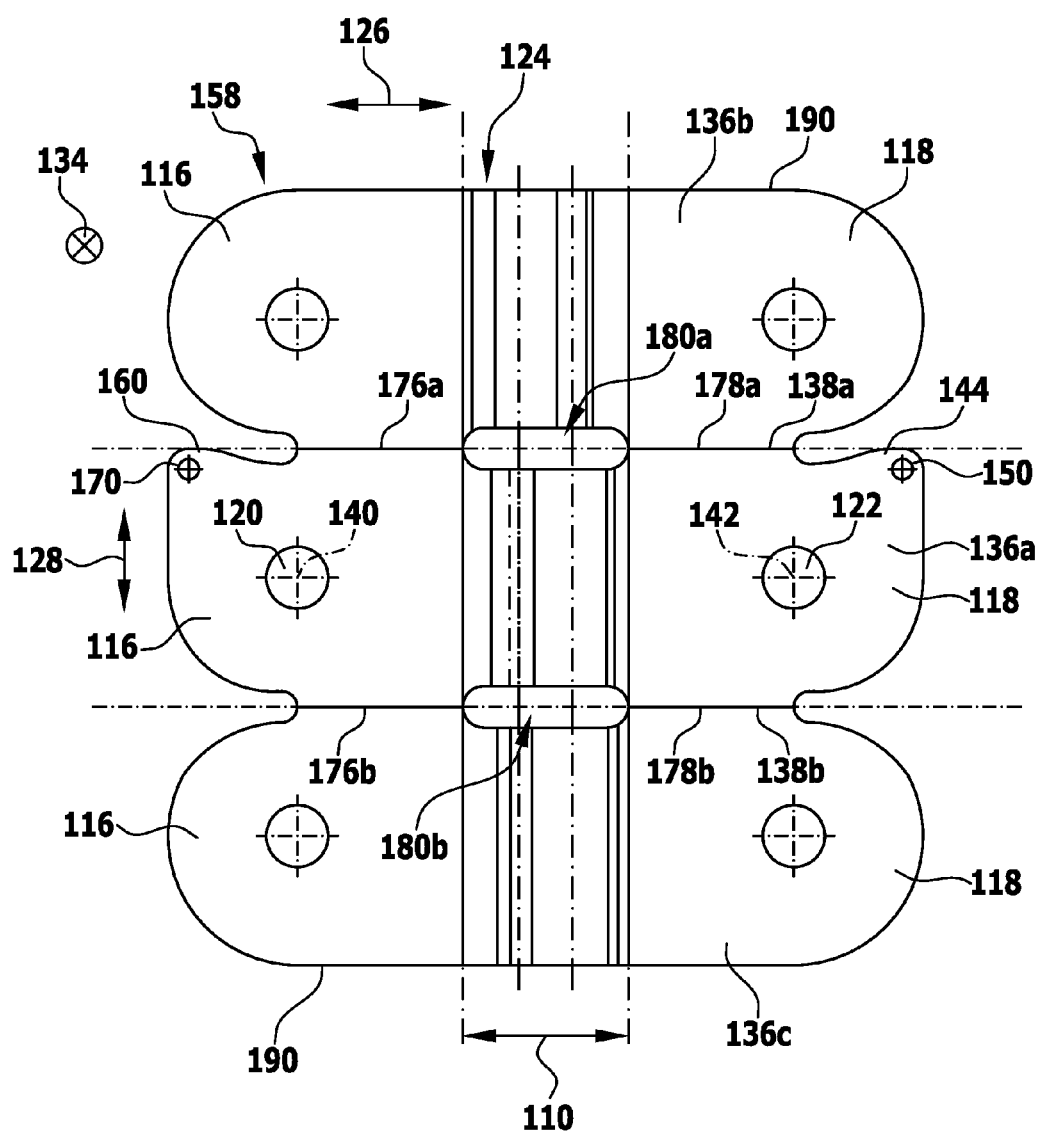
FIG. 35 shows a schematic plan view of a base body blank of the cell connector from FIG. 32.
Figure 36:
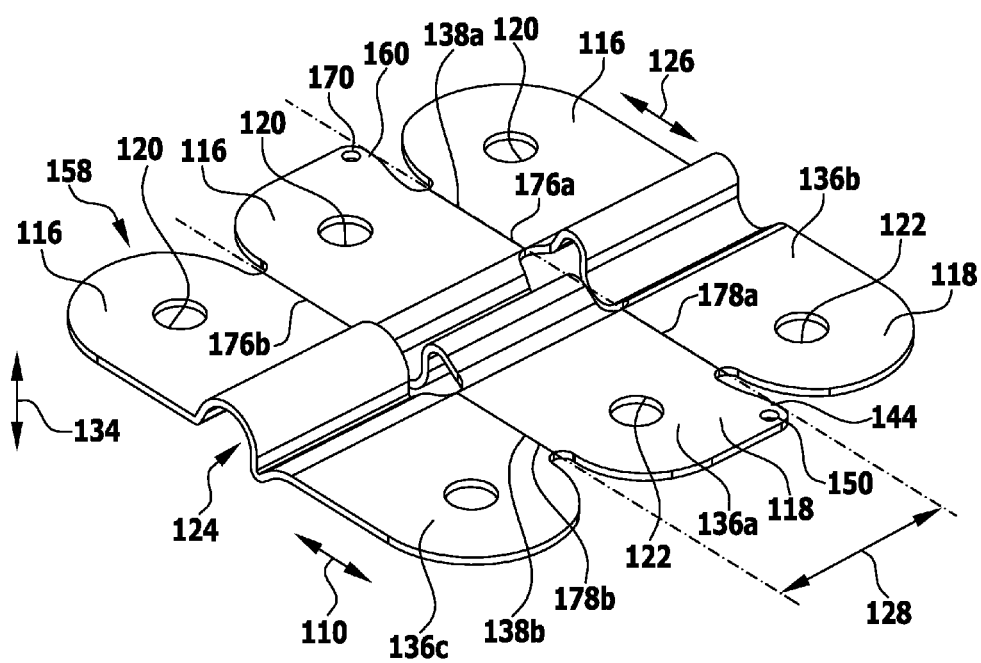
FIG. 36 shows a schematic perspective view of the base body blank from FIG. 35.
Figure 37:
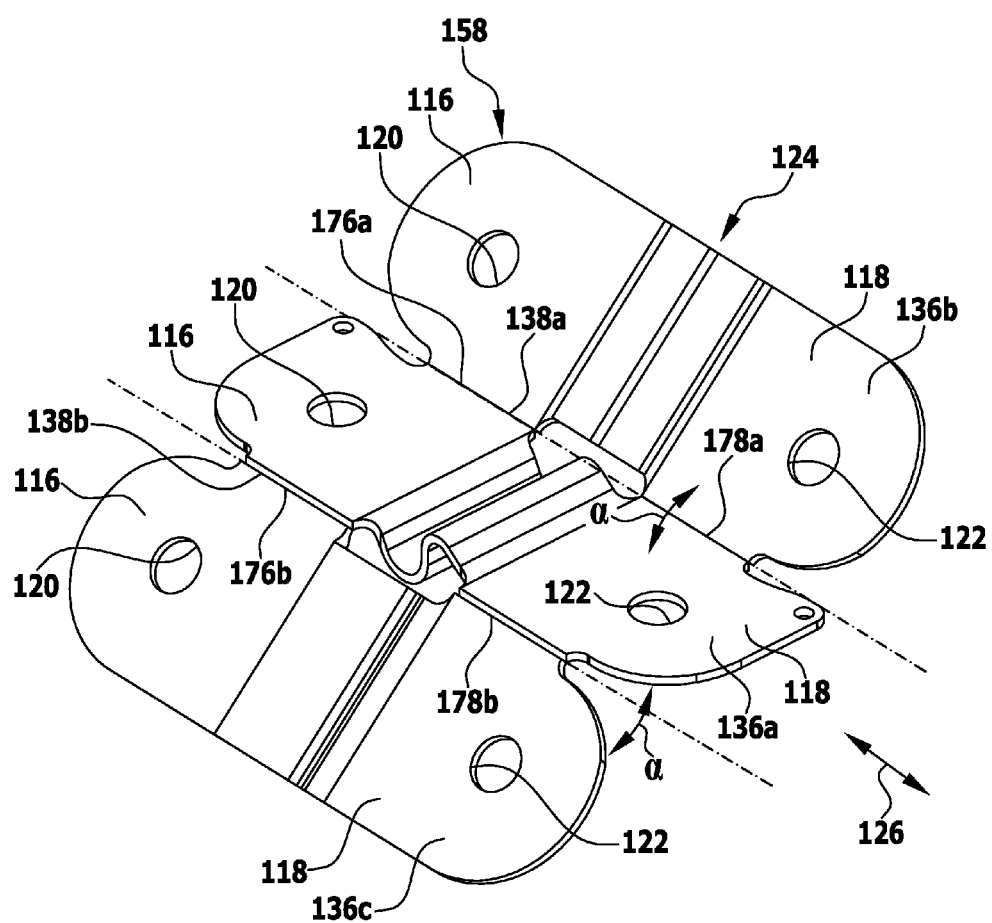
FIGS. 37 to 39 show schematic perspective views of the base body blank from FIG. 36 in three consecutive phases of a folding process, by which the cell connector base body according to FIG. 32 is formed from the base body blank according to FIG. 36.
Figure 38:
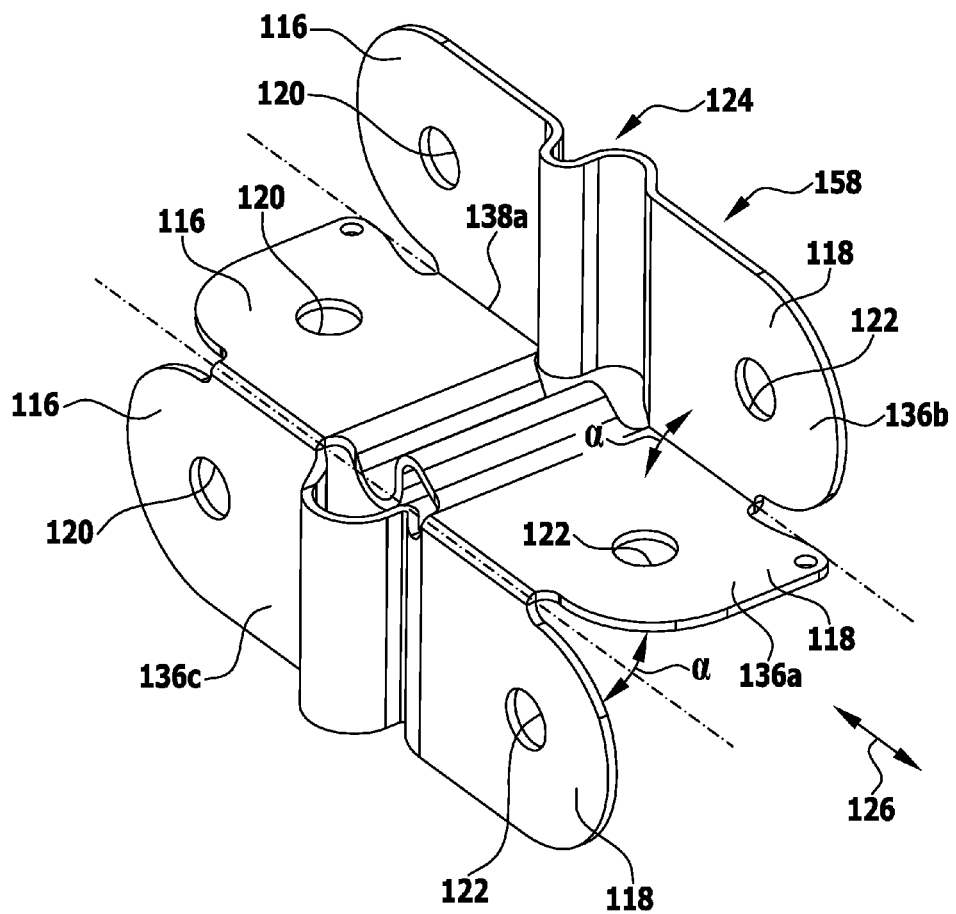
Figure 39:
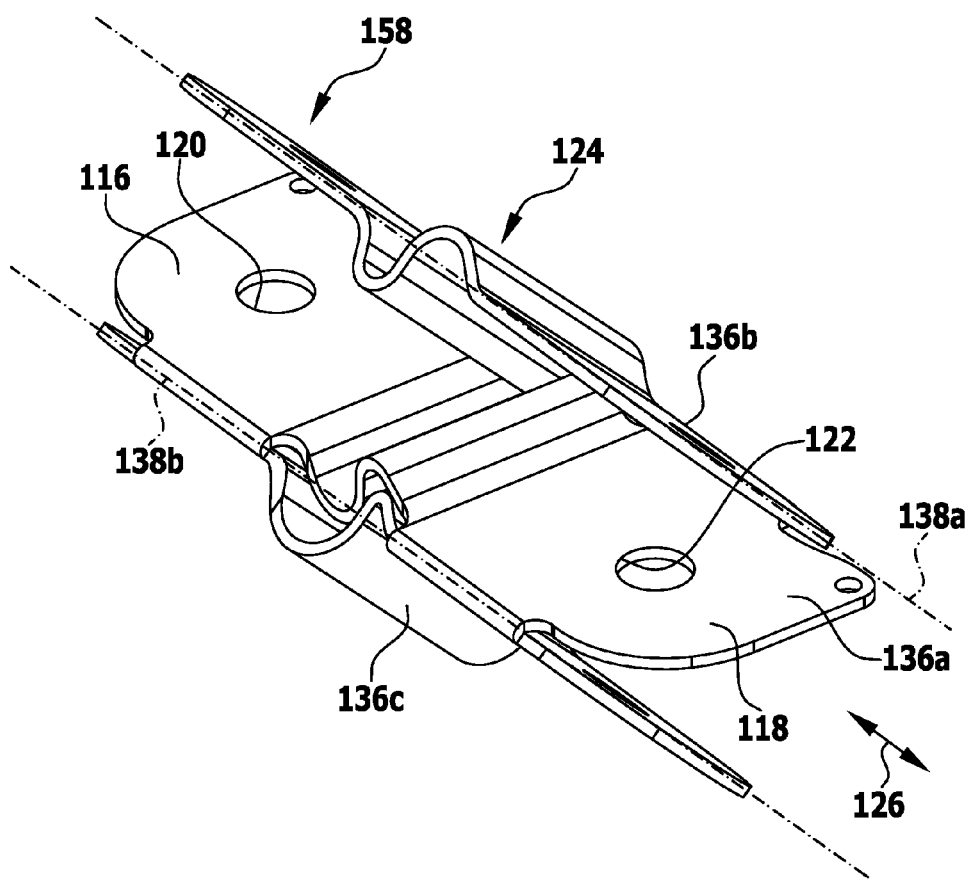

FIGS. 35 and 36 show a base body blank 138, from which the base body 114 according to FIGS. 32 to 34 is producible by a folding process, of which three consecutive phases are shown in FIGS. 37 to 39.

As can best be seen from FIG. 35, the first fold line 138*a* in this embodiment comprises a first portion 176*a*, which runs between the first contact region 116 of the first material layer 136*a* and the first contact region 116 of the second material layer 136*b* and a second portion 178*a*, which runs between the second contact region 118 of the first material layer 136*a* and the second contact region 118 of the second material layer 136*b*.

The two portions 176*a* and 178*a* of the first fold line 138 in this embodiment are separated from one another by a recess 180*a* located between them.

The recess 180*a* in the region of the compensation region 124 of the cell connector 112 makes it possible for the compensation regions 124 lying next to one another of the first material layer 136*a* and of the second material layer 136*b* to be complementary to one another.

In the fifth embodiment shown in FIGS. 32 to 39, the compensation region 124 does not have a plurality of, but in each case only one respective corrugation peak 134 and not a plurality of, but only one respective corrugation trough 132.

Basically, the number of peaks of the compensation regions 124 is arbitrary, however, so the fifth embodiment shown in FIGS. 32 to 39 can also be provided with a larger number of corrugations.

The second fold line 138*b* in this embodiment comprises a first portion 176*b*, which runs between the first contact region 116 of the first material layer 136*a* and the first contact region 116 of the third material layer 136*c*, and a second portion 178*b*, which runs between the second contact region 118 of the first material layer 136*a* and the second contact region 118 of the third material layer 136*c*.

The two portions 176*b* and 178*b* of the second fold line 138*b* in this embodiment are separated from one another by a recess 180*b* located between them.

The recess 180*b* in the region of the compensation region 124 of the cell connector 112 makes it possible for the compensation regions 124 lying next to one another of the first material layer 136*a* and of the third material layer 136*c* to be complementary to one another.

To produce the fifth embodiment of a cell connector 112, the base body blank 158 shows in FIGS. 35 and 36 is firstly separated out, for example stamped out or cut out (for example by means of a laser) from a starting material, for example from a starting material in the form of sheet metal.

In the base body blank 158, the first material layer 136*a*, the second material layer 136*b* and the third material layer 136*c* lie next to one another in the same plane along the later fold lines 138*a* and 138*b*.

The corrugation peaks 130 and corrugation troughs 132 of the respective compensation regions 124 are introduced into the material layers 136*a*, 136*b* and 136*c* of the base body blank 158 by suitable forming processes, in particular embossing or deep drawing processes.

Before or after this forming process, the through-openings 120 and 122 are introduced into the contact regions 116 or 118 of the material layers 136*a*, 136*b* and 136*c* of the base body blank 158.

The base body 114 of the cell connector 112 shown in FIGS. 32 to 34 is then produced from the base body blank 158 shown in FIGS. 35 and 36 by a folding process, in which the second material layer 136*b* and the third material layer 136*c* are folded about the respectively associated fold line 138*a* or 138*b* in such a way that the angle α included by the material layer 136*a*, on the one hand, and the material layers 136*b* and 136*c*, on the other hand, of initially 180° is reduced to 0° and the first material layer 136*a* and the second material layer 136*b* or the third material layer 136*c* finally lie substantially flat on one another.

In the phases that follow one another in time of the folding process, which are shown in FIGS. 37 to 39, the angle α included by the first material layer 136*a*, on the one hand, and the second material layer 136*b* and the third material layer 136*c*, on the other hand, is in each case 135° (FIG. 37), 90° (FIG. 38) and 45° (FIG. 39).

Basically it is possible, to connect the material layer 136*a*, on the one hand, and the material layers 136*b* and 136*c*, on the other hand, to one another after the folding process by a further measure, for example by welding, in addition to the one-piece connection along the fold line 138*a*, 138*b*, to avoid the base body 114 unintentionally unfolding again.

As, because of the course of the fold lines 138*a* and 138*b* parallel to the longitudinal direction 126 of the cell connector 112, the spacing of the free edges 190 of the material layers 136*b* and 136*c* from the respective fold line 138*a* or 138*b* is relatively small, however, in particular smaller than the entire extent of the fold lines 138*a* and 138*b* in the longitudinal direction 126 of the cell connector 112, such additional measures to connect the material layer 136*a* to the two other material layers 136*b* and 136*c* can be dispensed with, however.

The material layer 136*a* and the material layers 136*b* and 136*c* of the base body 114 of the cell connector 112, apart from the one-piece connection along the fold lines 138*a* and 138*b*, are therefore not connected to one another by any further measure (in other words, in particular, neither with a substance-to-substance bond nor non-positively).

The finished base body 114 according to FIGS. 32 to 34 is then connected (preferably by a substance-to-substance bond) to the cell terminals 108 of the electrochemical cells 102 to be connected to one another.

Otherwise, the fifth embodiment of a cell connector 112 shown in FIGS. 32 to 39 coincides with respect to structure, function and mode of production to the third embodiment shown in FIGS. 17 to 23, to the above description of which reference is to this extent made.

That which is claimed:

1. A cell connector for the electrically conductive connection of a first cell terminal of a first electrochemical cell and a second cell terminal of a second electrochemical cell of an electrochemical device, the cell connector comprising a first contact region for connection to the first cell terminal and a second contact region for connection to the second cell terminal, wherein the cell connector comprises a base body made of two or more material layers, at least two material layers being connected to one another in one piece along a fold line,
- wherein at least two material layers lie substantially flat on one another,
- wherein the base body of the cell connector has a resiliently and/or plastically deformable compensation region, which connects the first contact region and the second contact region to one another and allows a movement of these contact regions relative to one another,
- wherein the compensation region has a corrugated structure, the corrugated structure comprising one or more corrugations with an amplitude directed parallel to an axial direction of the electrochemical cells to be connected by the cell connector, and
- wherein the compensation region is configured in two or more material layers lying on one another.

2. The cell connector according to claim 1, wherein at least one fold line runs, at least in portions, transversely to a connection direction, which connects a center of the first contact region and a center of the second contact region to one another.

3. The cell connector according to claim 2, wherein at least one fold line runs substantially perpendicularly to the connection direction.

4. The cell connector according to claim 1, wherein at least one portion of at least one fold line runs along a lateral edge of the first contact region or of the second contact region.

5. The cell connector according to claim 1, wherein at least one fold line runs, at least in portions, substantially parallel to a connection direction, which connects a center of the first contact region and a center of the second contact region to one another.

6. The cell connector according to claim 1, wherein at least one fold line, in a first portion, runs along a lateral edge of the first contact region and, in a second portion, along a lateral edge of the second contact region.

7. The cell connector according to claim 6, wherein the fold line is interrupted between the first portion and the second portion by a recess.

8. The cell connector according to claim 1, wherein at least one of the material layers of the base body comprises at least two part material layers, which are connected in one piece to another material layer along fold lines that are different from one another.

9. The cell connector according to claim 1, wherein at least one of the material layers of the base body is connected in one piece to two other material layers along fold lines that are different from one another.

10. The cell connector according to claim 1, wherein the compensation region of the cell connector has at least one compensation corrugation, compensation bead or compensation bend line running transversely to a connection direction, which connects a center of the first contact region and a center of the second contact region to one another.

11. The cell connector according to claim 1, wherein the base body of the cell connector comprises at least one voltage tap.

12. The cell connector according to claim 11, wherein at least one voltage tap is strip-like.

13. The cell connector according to claim 11, wherein the base body of the cell connector comprises at least two voltage taps, one voltage tap being connected to the first contact region and a further voltage tap being connected to the second contact region.

14. The cell connector according to claim 11, wherein at least one voltage tap of the cell connector is formed in only one material layer of the base body of the cell connector.

15. A method for producing a cell connector, which comprises a first contact region for connection to a first cell terminal of a first electrochemical cell and a second contact region for connection to a second cell terminal of a second electrochemical cell, comprising the following method step:
- folding a base body blank along at least one fold line for producing a one-piece multi-layer base body of the cell connector;
- wherein the base body is made of two or more material layers and wherein at least two material layers lie substantially flat on one another,
- wherein the base body of the cell connector has a resiliently and/or plastically deformable compensation region, which connects the first contact region and the second contact region to one another and allows a movement of these contact regions relative to one another,
- wherein the compensation region has a corrugated structure, the corrugated structure comprising one or more corrugations with an amplitude directed parallel to an axial direction of the electrochemical cells to be connected by the cell connector, and
- wherein the compensation region is configured in two or more material layers lying on one another.

* * * * *